US009442711B2

(12) United States Patent
Koyama et al.

(10) Patent No.: US 9,442,711 B2
(45) Date of Patent: Sep. 13, 2016

(54) COMMUNICATION DEVICE, UPDATE METHOD, AND COMPUTER PROGRAM PRODUCT FOR UPDATING A PROGRAM BASED ON RECEIVED METAINFORMATION

(75) Inventors: Takeshi Koyama, Tokyo (JP); Alain Volmat, Tokyo (JP); Yoshinaga Kato, Kanagawa (JP); Shizu Kanauchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 438 days.

(21) Appl. No.: 13/233,668

(22) Filed: Sep. 15, 2011

(65) Prior Publication Data

US 2012/0072895 A1 Mar. 22, 2012

(30) Foreign Application Priority Data

Sep. 16, 2010 (JP) ................................ 2010-208531
Jun. 30, 2011 (JP) ................................ 2011-146599

(51) Int. Cl.
*G06F 9/45* (2006.01)
*G06F 9/445* (2006.01)

(52) U.S. Cl.
CPC ...................................... *G06F 8/65* (2013.01)

(58) Field of Classification Search
None
See application file for complete search history.

(56) References Cited

U.S. PATENT DOCUMENTS 6,847,403 B1 1/2005 Forsberg, Jr. et al.
6,976,251 B2 * 12/2005 Meyerson .................... 717/173
7,620,948 B1 * 11/2009 Rowe et al. ................. 717/171
8,375,385 B1 * 2/2013 Harel et al. .................. 717/173
2001/0020295 A1 * 9/2001 Satoh ..................... G06F 21/10 717/170
2004/0187103 A1 * 9/2004 Wickham et al. ............ 717/168
2004/0230968 A1 * 11/2004 Masunaga .............. H04L 29/06 717/171
2004/0255291 A1 * 12/2004 Sierer et al. ................. 717/174
2006/0031828 A1 * 2/2006 Won et al. .................... 717/168
2006/0069836 A1 * 3/2006 Seo et al. ...................... 710/302
2008/0256525 A1 * 10/2008 Ellsworth et al. ............ 717/168
2009/0217375 A1 * 8/2009 Joosten et al. ................. 726/19
2009/0235242 A1 * 9/2009 Kawaguchi .................. 717/168
2010/0011060 A1 * 1/2010 Hilterbrand et al. ......... 709/204

(Continued)

FOREIGN PATENT DOCUMENTS

JP 10-240539 9/1998
JP 2003-99264 4/2003

(Continued)

OTHER PUBLICATIONS

Office Action mailed Jan. 27, 2015, in Japanese Patent Application No. 2011-146599.

*Primary Examiner* — Lewis A Bullock, Jr.
*Assistant Examiner* — Christine Dang
(74) *Attorney, Agent, or Firm* — Oblon, McClelland, Maier & Neustadt, L.L.P.

(57) ABSTRACT

A communication device includes: a receiving unit that receives metainformation indicating an update from an update information providing device to provide information related to the update; a determining unit that determines, on the basis of the received metainformation, whether an update needed for the communication device exists; a notifying unit that notifies, when the update exists, a user of existence of the update; an operation unit that receives, when the update exists, a selection operation as to whether the update is to be executed from the user; and an update processing unit that executes, when the selection operation to execute the update is received by the operation unit, the update on the basis of the received metainformation.

18 Claims, 19 Drawing Sheets

(56) References Cited

U.S. PATENT DOCUMENTS

| | | | | |
|---|---|---|---|---|
| 2010/0153941 | A1* | 6/2010 | Borissov et al. | 717/168 |
| 2011/0088026 | A1* | 4/2011 | Swann | 717/173 |
| 2011/0173598 | A1* | 7/2011 | Cassapakis et al. | 717/168 |
| 2011/0289499 | A1* | 11/2011 | Haubold et al. | 717/173 |
| 2012/0210313 | A1* | 8/2012 | Cooley et al. | 717/171 |

FOREIGN PATENT DOCUMENTS

| | | |
|---|---|---|
| JP | 2005-228200 | 8/2005 |
| JP | 2006-178881 | 7/2006 |
| JP | 2008-90723 | 4/2008 |
| JP | 2008-186147 | 8/2008 |
| JP | 2009-211269 | 9/2009 |

* cited by examiner

FIG.6

(EXAMPLE OF METADATA)

```
{
  "version": "1.0.1",
  "dependency": "1.0.0",
  "description": "It is sample data.",
  "files": [
   {"src": "https://update.example.jp/1.0.1/NewFile.dll", "sha1sum":
"3ab15e931dcd60e5acfeac271bd09d57641611b6"},
   {"src": "https://update.example.jp/1.0.1/NewFirm.exe", "sha1sum":
"d296c72aaca0a168e319f5898fda3ee0e3e7d4c8"},
   {"src": "https://update.example.jp/1.0.1/update.dup", "sha1sum":
"e709041747e02c181df37d8ddc0a6296b712aaf1"}
  ],
  "scriptname": "update.dup",
  "require_reboot": "true",
  "force_update": "true"
}
```

COMMUNICATION DEVICE, UPDATE METHOD, AND COMPUTER PROGRAM PRODUCT FOR UPDATING A PROGRAM BASED ON RECEIVED METAINFORMATION

CROSS-REFERENCE TO RELATED APPLICATIONS

The present application claims priority to and incorporates by reference the entire contents of Japanese Patent Application No. 2010-208531 filed in Japan on Sep. 16, 2010 and Japanese Patent Application No. 2011-146599 filed in Japan on Jun. 30, 2011.

BACKGROUND OF THE INVENTION

1. Field of the Invention

The present invention relates to a communication device, an update method, and a computer program product.

2. Description of the Related Art

In recent years, with an increasing demand to cut back on expenses and time spent for business trips, call terminals for performing a teleconference through a communication network such as the Internet are widely prevailed. Each call terminal designates the call terminal of the destination to start a call, and hence transmission and reception of image data and voice data are performed. In this way, the teleconference is performed.

In each call terminal, firmware (a computer program) is regularly updated to improve call confidentiality and operability. A method of updating a computer program in the call terminal is disclosed in U.S. Pat. No. 6,847,403. U.S. Pat. No. 6,847,403 discloses a technology for automatically updating a computer program according to update information obtained by gaining access to an update server, without requiring an operation from a user.

However, in the call terminal according to the related art, when there is a computer program that needs to be updated in the call terminal according to the update information obtained by gaining access to the update server, an automatic update of the computer program starts. For this reason, the user cannot select time to update the computer program. Therefore, in the call terminal according to the related art, since updating the computer program may take a certain length of time, the demand of the user who wants to put off the update and to perform the teleconference first.

SUMMARY OF THE INVENTION

It is an object of the present invention to at least partially solve the problems in the conventional technology.

According to an aspect of the present invention, there is provided a communication device including: a receiving unit that receives metainformation indicating an update from an update information providing device to provide information related to the update; a determining unit that determines, on the basis of the received metainformation, whether an update needed for the communication device exists; a notifying unit that notifies, when the update exists, a user of existence of the update; an operation unit that receives, when the update exists, a selection operation as to whether the update is to be executed from the user; and an update processing unit that executes, when the selection operation to execute the update is received by the operation unit, the update on the basis of the received metainformation.

According to another aspect of the present invention, there is provided an update method that is executed by a communication device. The update method includes receiving metainformation indicating an update from an update information providing device to provide information related to the update; determining, on the basis of the received metainformation, whether an update needed for the communication device exists; notifying a user of existence of the update when the update exists; receiving, from the user, a selection operation as to whether the update is to be executed when the update exists; and executing, when the selection operation to execute the update is received at the receiving, the update on the basis of the received metainformation.

According to still another aspect of the present invention, there is provided a computer program product including a non-transitory computer-readable medium having computer-readable program codes recorded in the medium for causing a computer to execute: receiving metainformation indicating an update from an update information providing device to provide information related to the update; determining, on the basis of the received metainformation, whether an update needed for the computer exists; notifying a user of existence of the update when the update exists; receiving, from the user, a selection operation as to whether the update is to be executed when the update exists; and executing, when the selection operation to execute the update is received at the receiving, the update on the basis of the received metainformation.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a conceptual diagram illustrating an example of metadata;

DETAILED DESCRIPTION OF THE PREFERRED EMBODIMENTS

Hereinafter, embodiments of a method and a computer program that can improve convenience of a user will be described in detail with reference to the accompanying drawings.

First Embodiment

Figure 1:
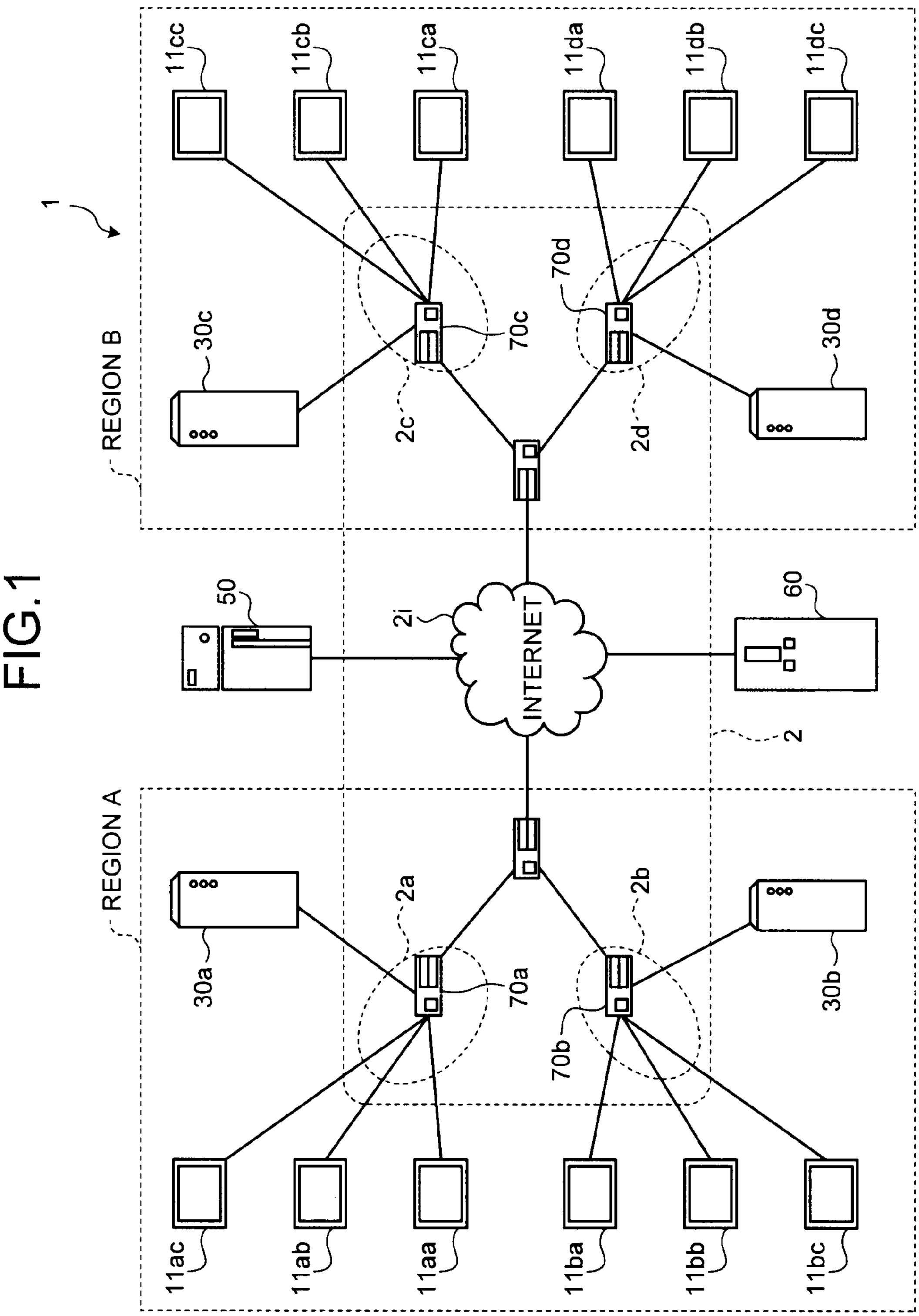
FIG. 1 is a schematic diagram illustrating an example of the configuration of a remote communication system.

FIG. 1 is a schematic diagram illustrating an example of the configuration of a remote communication system 1 according to the first embodiment. As illustrated in FIG. 1, the remote communication system 1 is a system in which call terminals 11*aa* to 11*ac*, 11*ba* to 11*bc*, 11*ca* to 11*cc*, and 11*da* to 11*dc* functioning as communication devices, a remote communication management server 50, an update server 60, and routers 70*a* to 70*d* are connected by a communication network 2 to communicate with each other. Specifically, the remote communication system 1 includes local area networks (LANs) 2*a*, 2*b*, 2*c*, and 2*d*, the remote communication management server 50, and the update server 60 that are connected to the Internet 2*i* through the routers 70*a* to 70*d*, the call terminals 11*aa* to 11*ac* and a repeater 30*a* that are connected to the LAN 2*a*, the call terminals 11*ba* to 11*bc* and a repeater 30*b* that are connected to the LAN 2*b*, the call terminals 11*ca* to 11*cc* and a repeater 30*c* that are connected to the LAN 2*c*, and the call terminals 11*da* to 11*dc* and a repeater 30*d* that are connected to the LAN 2*d*. In the remote communication system 1, under the management of the remote communication management server 50, the call terminals 11*aa* to 11*ac* and 11*ba* to 11*bc* of a region A and the call terminals 11*ca* to 11*cc* and 11*da* to 11*dc* of a region B can exchange a voice or an image with each other through relaying of communication data via the repeaters 30*a*, 30*b*, 30*c*, and 30*d*.

Specifically, the remote communication management server 50 manages communication addresses of the call terminals 11*aa* to 11*ac*, 11*ba* to 11*bc*, 11*ca* to 11*cc*, and 11*da* to 11*dc* and the repeaters 30*a*, 30*b*, 30*c*, and 30*d* and information of the call terminals relayed by the repeaters 30*a*, 30*b*, 30*c*, and 30*d* and call statuses of the call terminals. For example, when the call terminal 11*aa* calls the call terminal 11*ca*, the remote communication management server 50 requests the repeater 30*a* to relay a call to the call terminal 11*ca*. The repeater 30*a* notifies the remote communication management server 50 that a call of the call terminal 11*aa* starts, and acquires, from the remote communication management server 50, the communication address of the repeater 30*c* to relay a call to the call terminal 11*ca*. Next, the repeater 30*a* requests the repeater 30*c* to relay a call to the call terminal 11*ca* and the repeater 30*c* starts a communication session with the call terminal 11*ca*. Then, the repeater 30*c* notifies the remote communication management server 50 of the start of the communication session with the call terminal 11*ca*.

In this way, a call between the call terminal 11*aa* and the call terminal 11*ca* is started through the repeaters 30*a* and 30*c*. The remote communication management server 50 manages a call between the call terminal 11*aa* and the call terminal 11*ca*. For example, when the call terminal flab inquires of the remote communication management server 50 about a call status of the call terminal 11*aa* or the call terminal 11*ca*, the remote communication management server 50 returns that the call terminal 11*aa* or the call terminal 11*ca* are on-line and calling each other.

In the description below, reference numerals that are obtained by removing alphanumerical characters assigned after the numerical characters are used when an arbitrary device among the devices of the same type is described. For example, the call terminals 11*aa* to 11*ac*, 11*ba* to 11*bc*, 11*ca* to 11*cc*, and 11*da* to 11*dc* are abbreviated as a call terminal 11. The repeaters 30*a* to 30*d* are abbreviated as a repeater 30.

The update server 60 is an update information providing device that manages information related to update of the computer program or various setting information of the call terminal 11 and provides the information according to a request by the call terminal 11. Examples of the information that is related to the update include data files of all the versions, from the past to the latest, of the computer programs or the various setting information of the call terminal 11 and metadata (metainformation) where contents of the update for each version are described. The data of all of the versions is managed as the information related to the update by the update server 60 because update timing depends on each call terminal 11.

For example, it may be sufficient for the call terminal 11 that frequently executes the update to perform the update with a latest version. However, the call terminal 11 that has a long update interval may execute the update after several times of updating has been done for the versions. In this case, instead of executing directly the update with the latest version, the update may be first performed with an older version on which the latest version is dependent. As such, since the call terminal 11 may first execute the update with the older version on which the latest version is dependent, the update server 60 manages data of all of the versions as the information related to the update.

Note that there are two kinds of updates: a normal update and a compulsory update. The normal update is an update that is executed for the purpose of removing obstacles, such as bug fixing, or function addition.

The compulsory update is an update that is compulsorily executed in association with a change of a device or a function to which the current functions of the call terminal 11 cannot respond. For example, there may be a change that can be executed, on the side of the repeater 30, in the data format or the video codec of a voice or an image that is transmitted and received at the time of calling or a version-up of the repeater 30 related to an update of an encoder. Further, a communication protocol with the repeater 30 may be changed. The changes listed above may cause a change in the structure of the voice, the image, and the video, a communication method with the repeater 30 associated to the change in the communication protocol, or the function of the repeater 30. Accordingly, a call that is an original function of the call terminal 11 may not be realized with the call terminal 11 before an update. In such an occasion, therefore, the compulsory update is executed on the call terminal 11 to match the version of the repeater 30 after the update.

When a problem occurs in the security on the side of the repeater 30 such as a security hole that is found in the repeater 30, for example, an update in response to the security hole may be executed on the side of the repeater 30. In this case again, since the call terminal 11 before the update may not execute even a call, the compulsory update is executed on the call terminal 11*so* as to match the version of a computer program that copes with the security hole on the side of the repeater 30.

Figure 2:
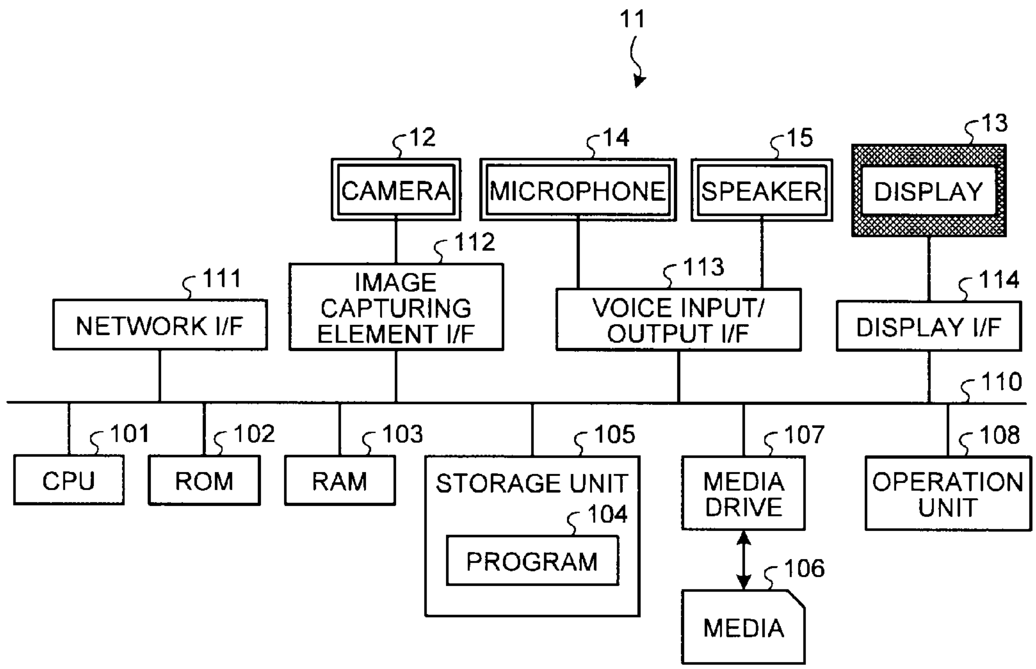
FIG. 2 is a block diagram illustrating an example of the hardware configuration of a call terminal.

Next, the hardware configuration of the call terminal 11 will be described. FIG. 2 is a block diagram illustrating an example of the hardware configuration of the call terminal 11. As illustrated in FIG. 2, the call terminal 11 includes a central processing unit (CPU) 101, a read only memory (ROM) 102, a random access memory (RAM) 103, a storage unit 105, a media drive 107, an operation unit 108, a network interface (I/F) 111, an image sensor element I/F 112, a voice input/output I/F 113, and a display I/F 114; the units are connected to each other by a bus 110.

The CPU 101 controls an operation of the call terminal 11 by uncompressing a computer program 104 having been stored in the ROM 102 or the storage unit 105 to the RAM 103 and sequentially executing the computer program 104. The storage unit 105 is a hard disk drive (HDD) or a solid state drive (SSD) and stores data to be readable/writable. Specifically, the storage unit 105 stores the computer program 104 to be executed by the CPU 101 or the various setting information thereof. In the updating, the computer program 104 or the various setting information that is stored in the storage unit 105 is updated.

The media drive 107 is a drive device that performs a read/write operation on media 106 such as an optical disk. The operation unit 108 is a keyboard, various operation keys, and a touch panel staked on a display 13 and receives an operation input by the user. The network I/F 111 is an interface that is connected to the communication network 2 and performs data communication. The image sensor element I/F 112 is an interface that is connected to a camera 12 that is a digital camera and acquires an image captured by the camera 12. The voice input/output I/F 113 is an interface that is connected to a microphone 14 and a speaker 15 and performs a voice input by the microphone 14 or a voice output by the speaker 15. The display I/F 114 is an interface that is connected to the display 13 such as a liquid crystal display (LCD) and outputs display data to the display 13.

In this embodiment, the display 13 is used. However, instead of the display 13, another display apparatus such as a projector may be connected to configure the embodiment.

The call terminal 11 outputs, under control of the CPU 101 executing the computer program 104, an image acquired by using the camera 12 or a voice input from the microphone 14 to the repeater 30 through the network I/F 111 during the calling with another call terminal. The call terminal 11 outputs, by the speaker 15, a voice that has been transmitted from another terminal, relayed by the repeater 30 and input through the network I/F 111, and displays an image from another call terminal on the display 13. Thereby, the call terminal 11 realizes a call with another call terminal through images and voices, that is so-called a teleconference.

Figure 3:
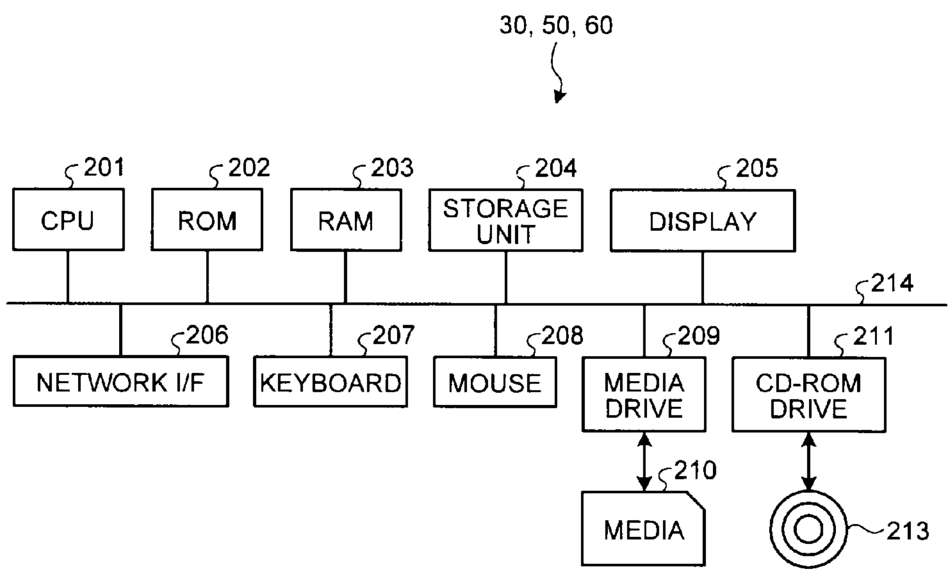
FIG. 3 is a block diagram illustrating an example of the hardware configuration of a repeater, a remote communication management server, and an update server.

Next, the hardware configuration of the repeater 30, the remote communication management server 50, and the update server 60 will be described. FIG. 3 is a block diagram illustrating an example of the hardware configuration of the repeater 30, the remote communication management server 50, and the update server 60. As illustrated in FIG. 3, each of the repeater 30, the remote communication management server 50, and the update server 60 includes a CPU 201, a ROM 202, a RAM 203, a storage unit 204, a display 205, a network I/F 206, a keyboard 207, a mouse 208, a media drive 209, and a CD-ROM drive 211, and all the units are connected to each other by a bus 214. Each of the repeater 30, the remote communication management server 50, and the update server 60 is an apparatus, such as a personal computer (PC) or a workstation (WS).

The CPU 201 uncompresses a computer program stored in the ROM 202 or the storage unit 204 to the RAM 203, sequentially executes the computer program, and performs a central control of an operation of the self device. The storage unit 204 is an HDD or an SSD and stores data to be readable/writable. For example, in the update server 60, information that is related to an update is stored in the storage unit 204.

The display 205 is, for example, an LCD. The network I/F 206 is an interface that is connected to the communication network 2 and performs data communication. The keyboard 207 and the mouse 208 receive an operation input by the user. The media drive 209 is a drive device, such as an optical disk, to perform a read/write operation on media 210. The CD-ROM drive 211 is a drive device that performs a read operation on a CD-ROM 213. For example, in the update server 60, latest information that is related to an update is provided by the media 210 or the CD-ROM 213 and is stored in the storage unit 204.

Figure 4:
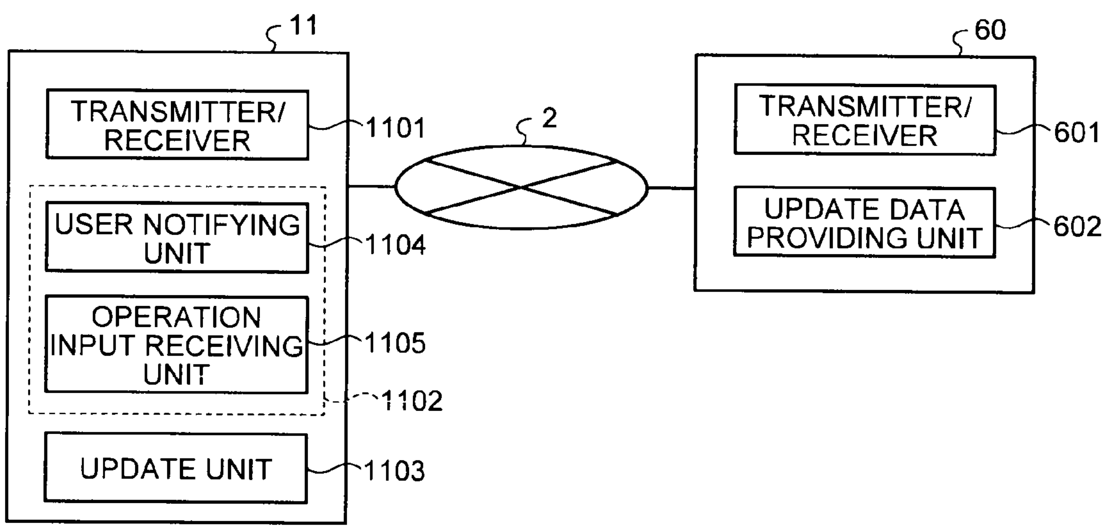
FIG. 4 is a block diagram illustrating an example of the functional configuration of a call terminal and an update server according to a first embodiment.

Next, the functional configuration of the call terminal 11 and the update server 60 that is realized by executing a computer program by the CPU 101 or the CPU 201 will be described. FIG. 4 is a block diagram illustrating an example of the functional configuration of the call terminal 11 and the update server 60 according to the first embodiment. As illustrated in FIG. 4, the call terminal 11 includes a transmitter/receiver 1101, a user interface unit 1102, and an update unit 1103 as main components. The update server 60 includes a transmitter/receiver 601 and an update data providing unit 602 as main components.

The transmitter/receiver 1101 exchanges data with the update server 60 through the communication network 2. Specifically, the transmitter/receiver 1101 starts a communication session using a predetermined communication protocol, on the basis of the communication address of the update server 60 preset in the setting information of the storage unit 105 or the communication address of the update server 60 acquired by an inquiry to the remote communication management server 50, and exchanges data with the update server 60. By exchanging the data with the update server 60, the transmitter/receiver 1101 acquires information related to an update that is managed by the update server 60.

The user interface unit 1102 is an interface that controls a voice output by the speaker 15, a display screen of the display 13, and an operation input from the user through the operation unit 108 and controls information transfer between the user and the call terminal 11. Specifically, the user interface unit 1102 includes a user notifying unit 1104 that notifies the user of various types of information through the voice output by the speaker 15 and the display screen of the display 13 and an operation-input receiving unit 1105 that receives an operation input by the user through the operation unit 108.

The update unit 1103 functions as a determining unit and an update processing unit and updates the computer program 104 or various setting information stored in the storage unit 105, on the basis of the information related to an update acquired from the update server 60 by the transmitter/receiver 1101. The update that is executed by the update unit 1103 will be described in detail in the explanation of an update process (step S16).

The transmitter/receiver 601 exchanges data with the call terminal 11 through the communication network 2. Specifically, the transmitter/receiver 601 starts a communication session using a predetermined communication protocol in response to a request from the call terminal 11 through the communication network 2 and exchanges the data with the call terminal 11.

The update data providing unit 602 provides information related to an update managed by the update server 60 to the call terminal 11 in response to a request from the call terminal 11 transmitting/receiving data by the transmitter/receiver 601.

Figure 5:
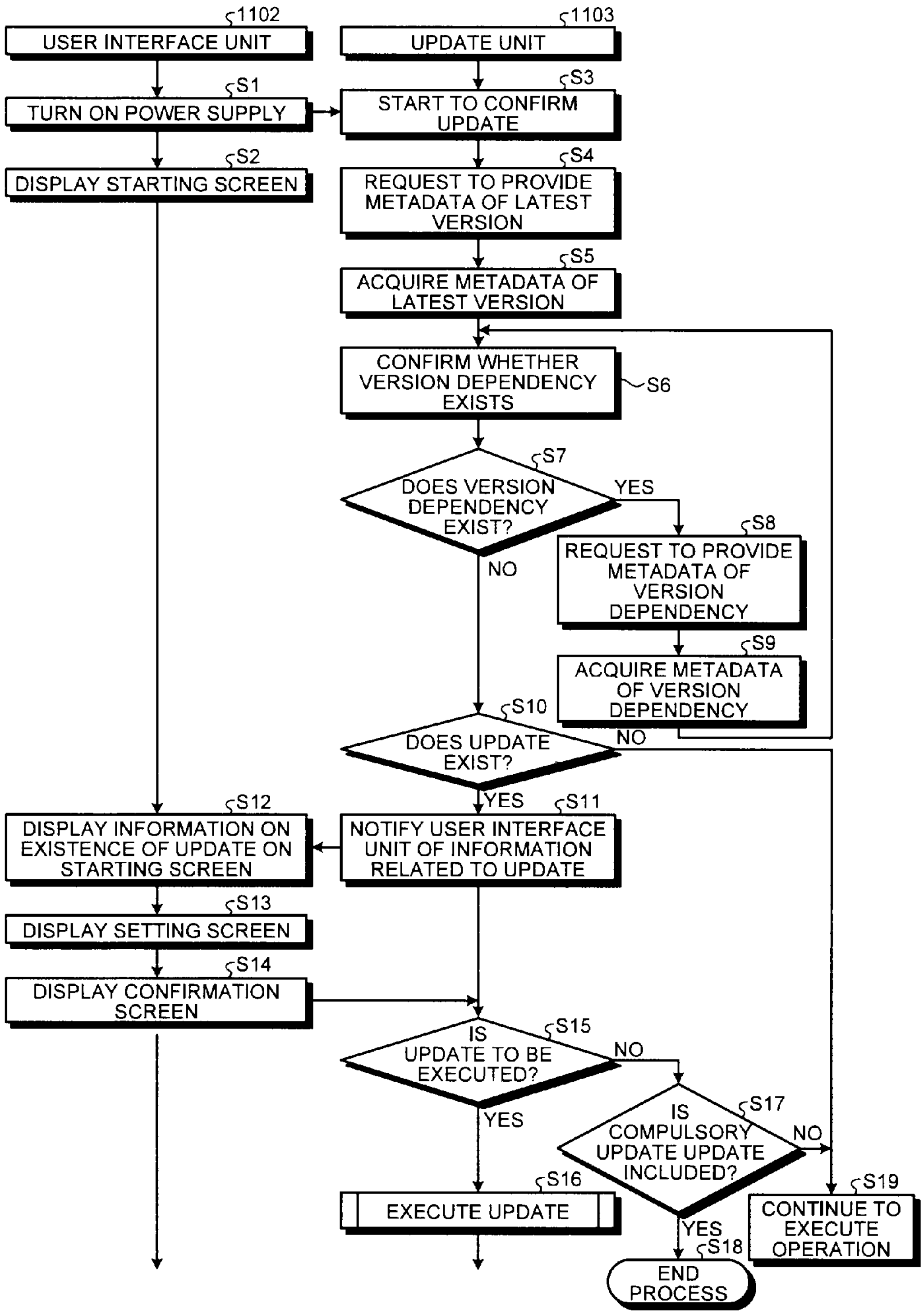
FIG. 5 is a ladder chart illustrating an example of an operation of the call terminal according to the first embodiment.

Here, an operation of the call terminal 11 that is executed by the functional configuration described above will be described in detail. FIG. 5 is a ladder chart illustrating an example of the operation of the call terminal 11 according to the first embodiment.

As illustrated in FIG. 5, the user interface unit 1102 turns on a power supply of the self device (step S1) according to an operation of a power switch, or the like, of the operation unit 108 and displays a starting screen on the display 13 (step S2). The starting screen is a display screen that displays a list of call statuses of all the call terminals 11 that are obtained by an inquiry to the remote communication management server 50 under control of the CPU 101 (which will be described in detail below).

The update unit 1103 starts to confirm the update of the self device, at the time of starting after turning on the power supply at step S1 (step S3). In the description below, the update of the computer program is exemplified. However, it is needless to say that the various setting information is also updated in the same way.

If the confirmation of the update starts, the update unit 1103 requests, via the transmitter/receiver 1101, the update server 60 to provide metadata of a computer program of the latest version (step S4), and acquires the metadata provide by the update data providing unit 602 in response to the request (step S5).

Here, the details of the metadata will be described below. FIG. 6 is a conceptual diagram illustrating an example of the metadata. As illustrated in FIG. 6, metadata of each version includes data items, such as "version", "dependency", "description", "files", "scriptname", "require_reboot", and "force_update".

In the item "version", a version number such as "1.0.1" is written. In the item "dependency", a version number indicating other version, such as "1.0.0", that has mutual dependency with "1.0.1", is written. Therefore, a version that has dependency with the current version can be traced by checking the version number written in the data item of the "dependency". In the item "description", the details of the version such as "It is sample data." is written. In the item "files", a list of computer programs (data files) becoming objects of the update managed by the update server 60 and storage places thereof or a checksum of the data files is written. Therefore, the update unit 1103 acquires the data files by the transmitter/receiver 1101, on the basis of contents written in the data items of the "files". As a result, the update unit 1103 can update the version that is written in the metadata. In the "scriptname", a name of a script that is executed when an update is executed is written. In the "require_reboot", a flag ("true" or "false") indicating whether the device should reboot after executing the update is written. In the "force_update", a flag ("true" or "false") indicating whether the update is a compulsory update is written.

The update of the computer program 104 is associated with control of the devices such as the network I/F 111, the image sensor element I/F 112, the voice input/output I/F 113, and the display I/F 114. In the update associated with the control of the devices, the reboot is needed after the update. Therefore, "true" is written in the item "require_reboot". As described above, the update of the computer program 104 include the normal update and the compulsory update. When the compulsory update should be executed, "true" is written in the "force_update".

Next, the update unit 1103 confirms whether a version dependency exists, on the basis of contents described in the data item of the "dependency" of the acquired metadata (step S6). As illustrated in FIG. 6, when the version number indicating other version such as "1.0.0" is described in the data item of the "dependency", it is determined that there is a version on which the current version depends. When no content is described in the data item of the "dependency", it is determined that there is no version on which the current version depends.

Next, the update unit 1103 determines whether the version dependency exists as a result of the confirmation at step S6 (step S7). When the version dependency exists (Yes at step S7), the update unit 1103 requests the update server 60 to provide the metadata of the computer program on the version dependency by the transmitter/receiver 1101 (step S8), acquires the metadata on the version dependency provided by the update data providing unit 602 in response to the request (step S9), and returns the process to step S6. Therefore, the update unit 1103 sequentially traces versions with which the latest version has dependency and acquires metadata that is related to the versions.

Next, the update unit 1103 compares the version number written in the "version" of the metadata of the latest version and the version number of the computer program 104 stored in the storage unit 105 included in the self device and determines whether the update of the self device exists (that is, whether an update has been completed) (step S10). Specifically, when the version number of the latest version matches the version number of the computer program 104, because the version of the computer program 104 is the latest version, it is determined that an update needed for the self device does not exist (that is, the update has been completed). When the version number of the latest version does not match the version number of the computer program 104, because the version of the computer program 104 is an old version, it is determined that an update needed for the self device exists (that is, the update has not been completed yet). When the update needed for the self device does not exist (No at step S10), because the update does not need to be executed, execution of the normal operation is continued (step S19).

When the update of the self device exists (Yes at step S10), the update unit 1103 notifies the user interface unit 1102 of information related to the update (step S11). Specifically, the update unit 1103 notifies the user interface unit 1102 of the data items other than the data items that do not need to be notified to the user, such as the "files" or the "scriptname", among the metadata of the latest version and the version dependency of the latest version, as the information related to the update.

The user notifying unit 1104 of the user interface unit 1102 displays existence of the update needed for the self device on the starting screen of the display 13, on the basis of the information related to the update notified by the update unit 1103 at step S11, and notifies the user of the existence of the update (step S12).

Figure 7:
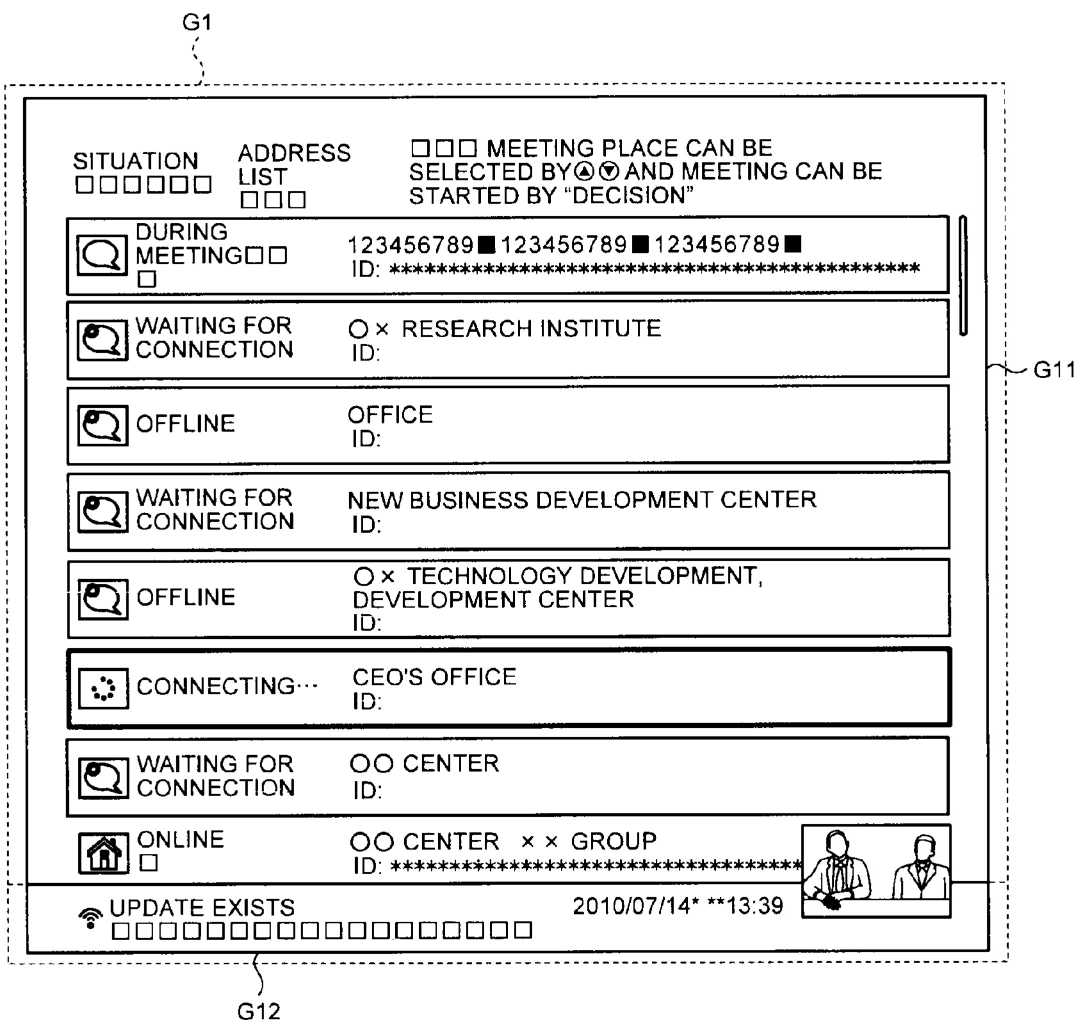
FIG. 7 is a conceptual diagram illustrating an example of a starting screen.

Here, the details of the starting screen will be described below. FIG. 7 is a conceptual diagram illustrating an example of a starting screen G1. As illustrated in FIG. 7, the starting screen G1 includes a main screen G11 that displays a list of call statuses of the call terminals and a status screen G12 that displays a status of the self device. When the information related to the update is notified by the update unit 1103, the user notifying unit 1104 displays existence of the update on the status screen G12 and notifies the user of the existence of the update. The display of the existence of the update is not limited to the layout illustrated in the drawings and a predetermined icon image may be displayed on the main screen G11 to notify the existence of the update. In the examples of the screens that are illustrated in the drawings (FIGS. 7 to 10, 12, 13, and the like), portions that are displayed by white squares or black squares indicate areas where a message may be displayed, and are, for example, message display areas that are reserved on a system.

The user notifying unit 1104 displays, when "true" is written in the "force_update" among the data items included as the information related to the update, information indicating that the update existing on the self device is the compulsory update on the starting screen G1 and notifies the user of the information. Specifically, the information indicating that the update is the compulsory update may be displayed on the status screen G12 and the list displayed on the main screen G11 may be grayed out to notify the user that an operation other than the update is invalid.

When an operation instruction to perform various setting such as an update is received by the operation-input receiving unit 1105 of the user interface unit 1102 according to the notification to the user at step S12, the user interface unit 1102 displays a setting screen on the display 13 (step S13).

Figure 8:
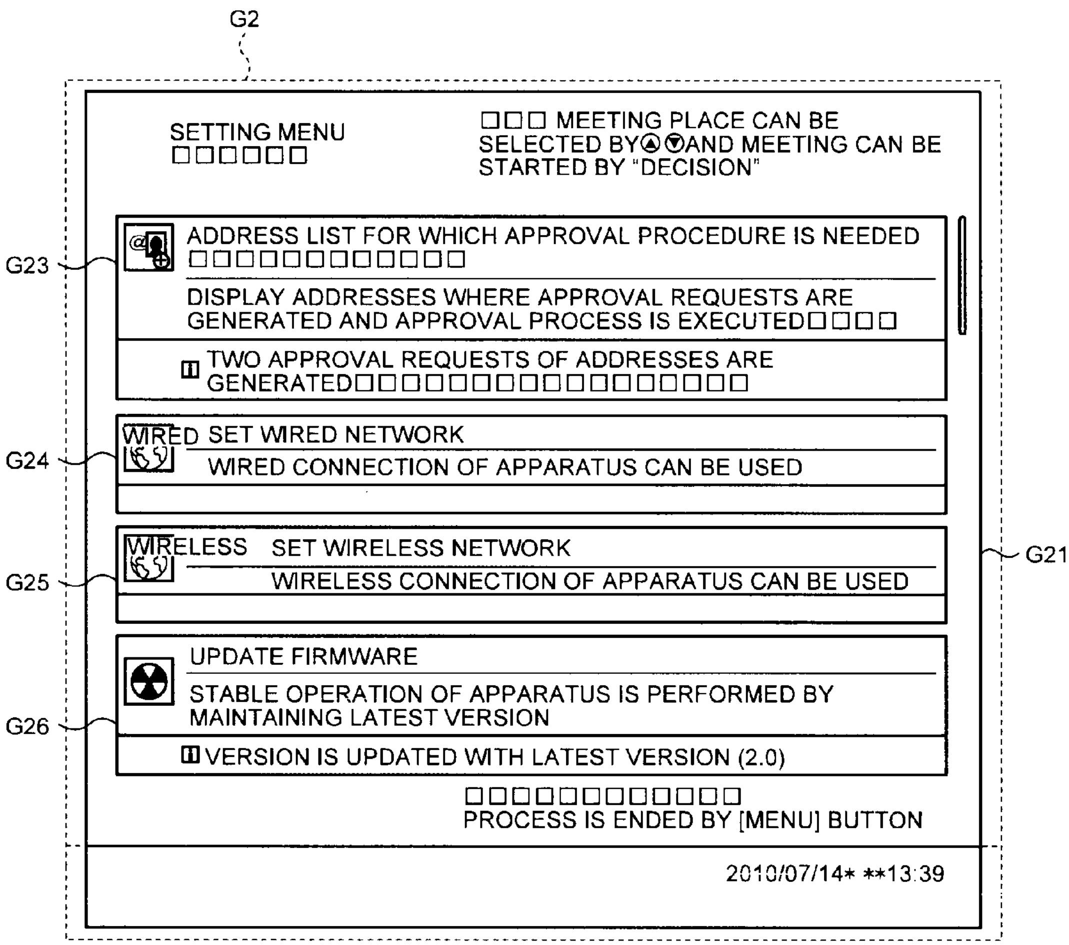
FIG. 8 is a conceptual diagram illustrating an example of a setting screen.

FIG. 8 is a conceptual diagram illustrating an example of the setting screen G2. As illustrated in FIG. 8, the setting screen G2 includes a main screen G21 that displays setting buttons G23 to G26 to perform various settings upon receiving the selection operation by the user through the operation-input receiving unit 1105. The setting button G26 among the setting buttons G23 to G26 is a button to instruct to execute an update. When the information related to the update is not notified by the update unit 1103 and the update does not exist in the self device, the setting button G26 will be grayed out to invalidate the selection operation. In contrast, when the information related to the update is notified by the update unit 1103 and the update exists in the self device, the gray-out is released and the selection operation by the user is received through the operation-input receiving unit 1105. In this case, in the setting button G26, a version number of the latest version for which the update is executed may be written, on the basis of the description of the "version" of the data item included as the information related to the update. In the example illustrated in the drawings, an update with the latest version having the version number of 2.0 is described. On the setting screen G2, a status screen to display a status of the self device may be displayed.

When the selection operation of the setting button G26 is executed at step S13, the user interface unit 1102 displays a confirmation screen to confirm execution of the update on the display 13 (step S14).

Figure 9:
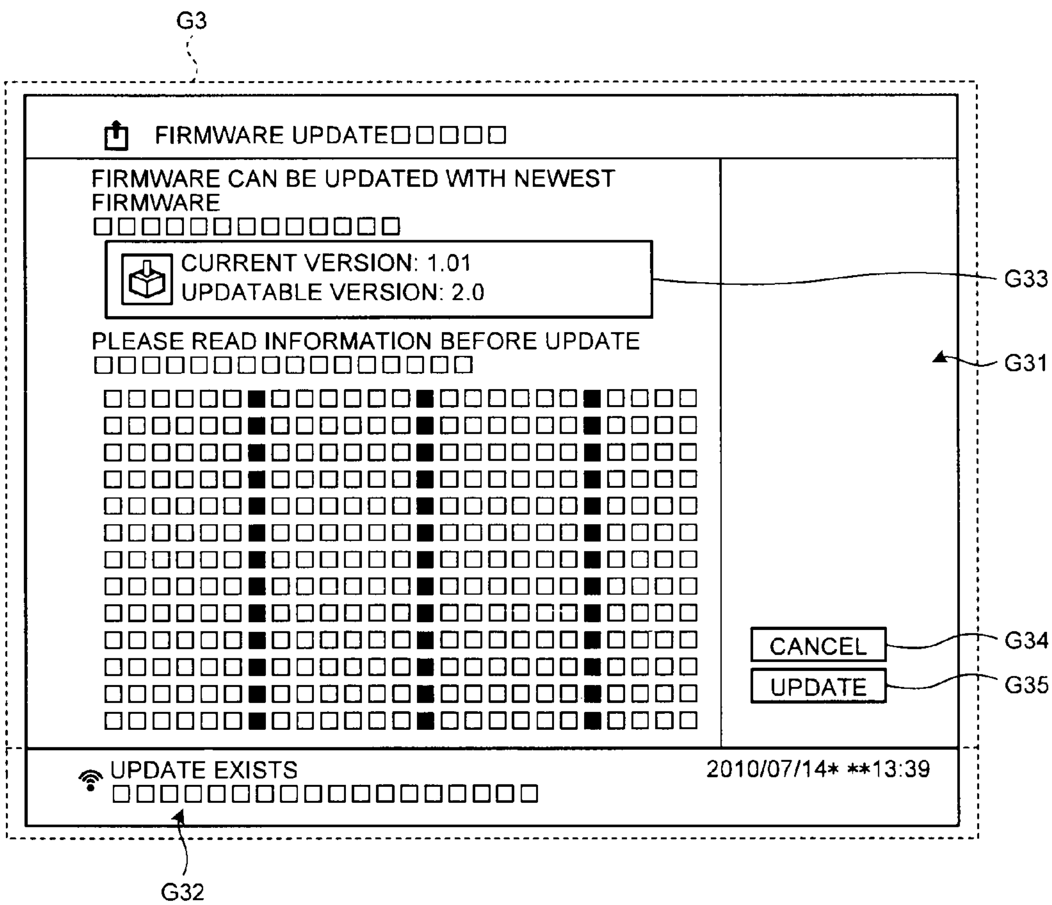
FIG. 9 is a conceptual diagram illustrating an example of a confirmation screen according to the first embodiment.

FIG. 9 is a conceptual diagram illustrating an example of a confirmation screen G3. As illustrated in FIG. 9, the confirmation screen G3 includes a main screen G31 that includes an update display G33 displaying contents of an executed update and operation buttons G34 and G35 to receive an instruction of execution of the update according to the contents or cancellation of the update from the user and a status screen G32 displaying a status of the self device. Information on the current version number, that is the version number of the computer program 104 of the self device, the version number of the latest version where the update is to be executed on the basis of the description of the "version" of the data item included as the information related to the update, and the like is displayed on the update display G33 and is notified to the user. Therefore, the user can confirm, based on the contents displayed on the update display G33, the number of the version on which the updating is executed. On the update display G33 of the confirmation screen G3, information as to whether the reboot is to be performed may be displayed.

Figure 10:
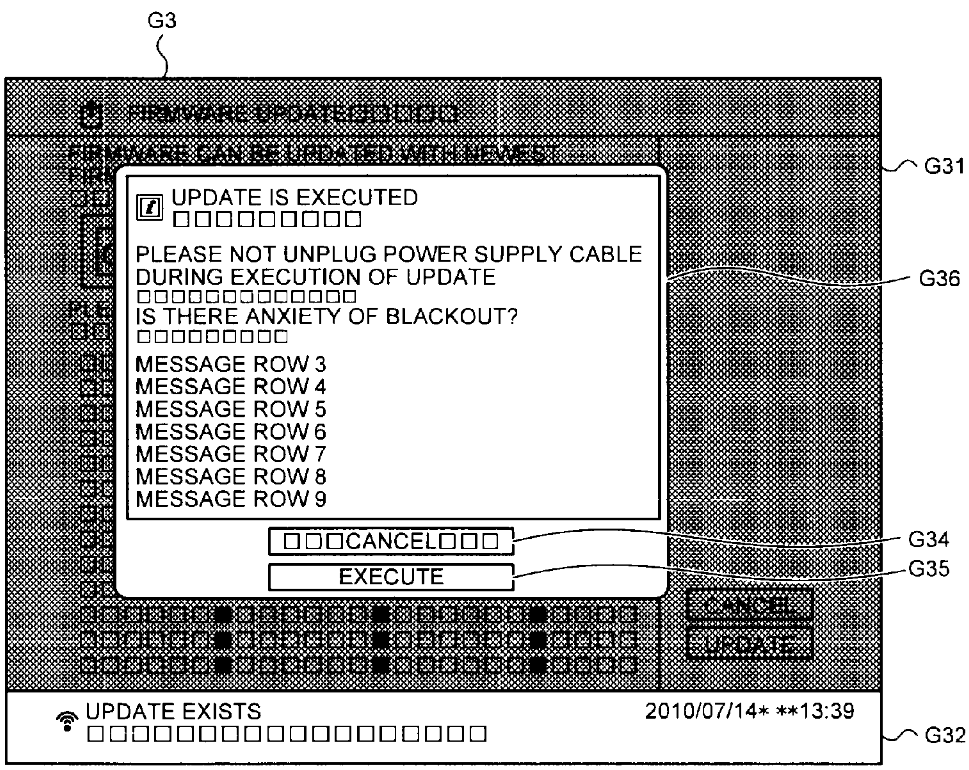
FIG. 10 is a conceptual diagram illustrating an example of a confirmation window according to the first embodiment.

FIG. 10 is a conceptual diagram illustrating an example of a confirmation window G36. In the confirmation screen G3, when the operation button G35 to instruct the execution of the update is selected, the confirmation window G36 that urges the user to confirm the update may be displayed. On the confirmation window G36, information on the version number of the latest version on which the update is executed and important notes that require attention at the time of the predetermined update are displayed. In the confirmation screen G3, when the execution of the update is instructed, the confirmation window G36 may be displayed to call the attention of the user. On the confirmation window G36, information as to whether the reboot is to be performed may be displayed.

Returning to FIG. 5, the update unit 1103 determines whether the update is to be executed on the basis of the selection operation of the operation buttons G34 and G35 in the confirmation screen G3 (step S15). When the operation button G35 to instruct the execution of the update is selected (Yes at step S15), the update unit 1103 executes an update process on the basis of the acquired metadata (step S16).

When the operation button G34 to cancel the execution of the update processes is selected and the selection of the operation button G35 is not performed (No at step S15), the update unit 1103 determines whether the compulsory update is included in the update processes that have not been executed, on the basis of the described content in the item "force_update" included in the acquired metadata (step S17). When the compulsory update is included (Yes at step S17), the update unit 1103 executes an end process to end the process of the self device (step S18) and turns off the power supply to the device. As such, when the compulsory update is not executed, because even a call cannot be executed, the power supply of the device is turned off to prevent in advance an unnecessary operation from being executed. In contrast, when the compulsory update is not included (No at step S17), because the update unit 1103 does not execute the update at the current time, execution of a normal operation is continued. Thereby, the user may perform the call with more preference to the update.

That is, in the call terminal 11, when the update of the self device exists, existence of the update is notified to the user by the user notifying unit 1104 of the user interface unit 1102. The call terminal 11 receives a selection operation as to whether the update is to be executed from the user using the operation-input receiving unit 1105. When the selection operation to execute the update is performed, an update process is executed by the update unit 1103. Therefore, the user can selectively execute the update of the call terminal 11 when the update exists in the self device.

Figure 11:
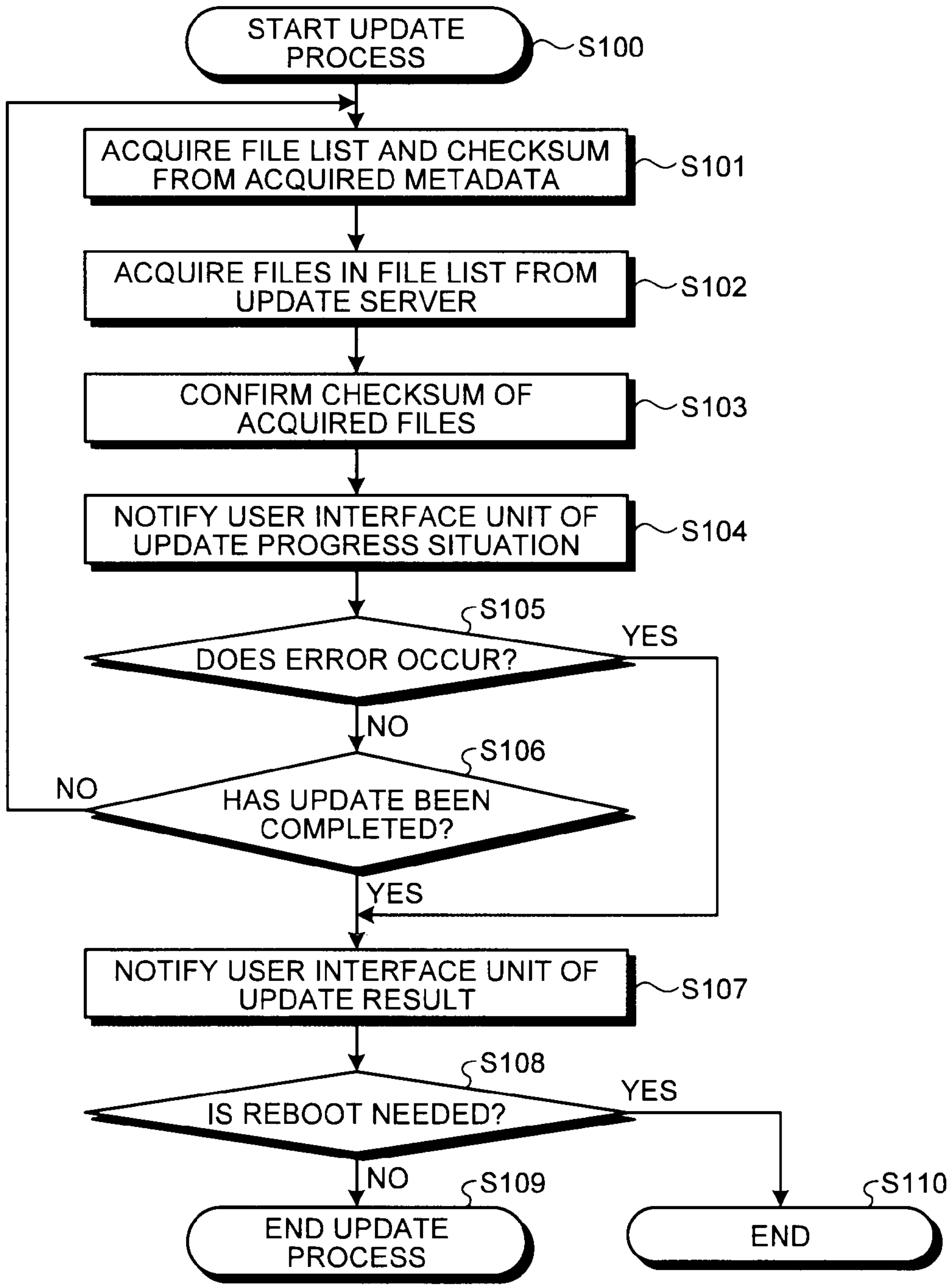
FIG. 11 is a flowchart illustrating an example of an update process according to the first embodiment.

Here, the details of the update process (step S16) will be described below. FIG. 11 is a flowchart illustrating an example of the update process.

As illustrated in FIG. 11, if the update process starts (step S100), the update unit 1103 stops a function of an interface unit such as the image sensor element I/F, 112 the voice input/output I/F 113, and the like for connecting to external devices such as the camera 12, the microphone 14, and the speaker 15. If the interface unit is operated, because the computer program related to the interface unit is being used, an error may occur in an update. In order to prevent the error from occurring in advance, the update unit 1103 stops the function of the interface unit in conjunction with the start of the update process.

Next, the update unit 1103 acquires a file list of computer programs being objects of the update and a checksum of the files from the item "files" included in the acquired metadata (step S101). When plural versions of metadata in a dependency relation are acquired, the processes at step S101 to S106 are executed in the order of the version numbers.

Next, the update unit 1103 acquires a file containing the file list acquired at step S101 (step S102) and confirms the checksum of the acquired files (step S103). Then, the update unit 1103 notifies the user interface unit 1102 of a progress status of the update (step S104). The notification of the progress status is used to notify the user of the file, among a plurality of files included in the file list, up to which the processes at steps S102 and S103 have ended. When an update is performed for a plurality of versions among which the version dependency exists, the notification may be performed on up to which version the update has been executed already. The user interface unit 1102 displays the notified progress status of the update on a screen of the display 13 to notify the user of the progress status of the update.

Figure 12:
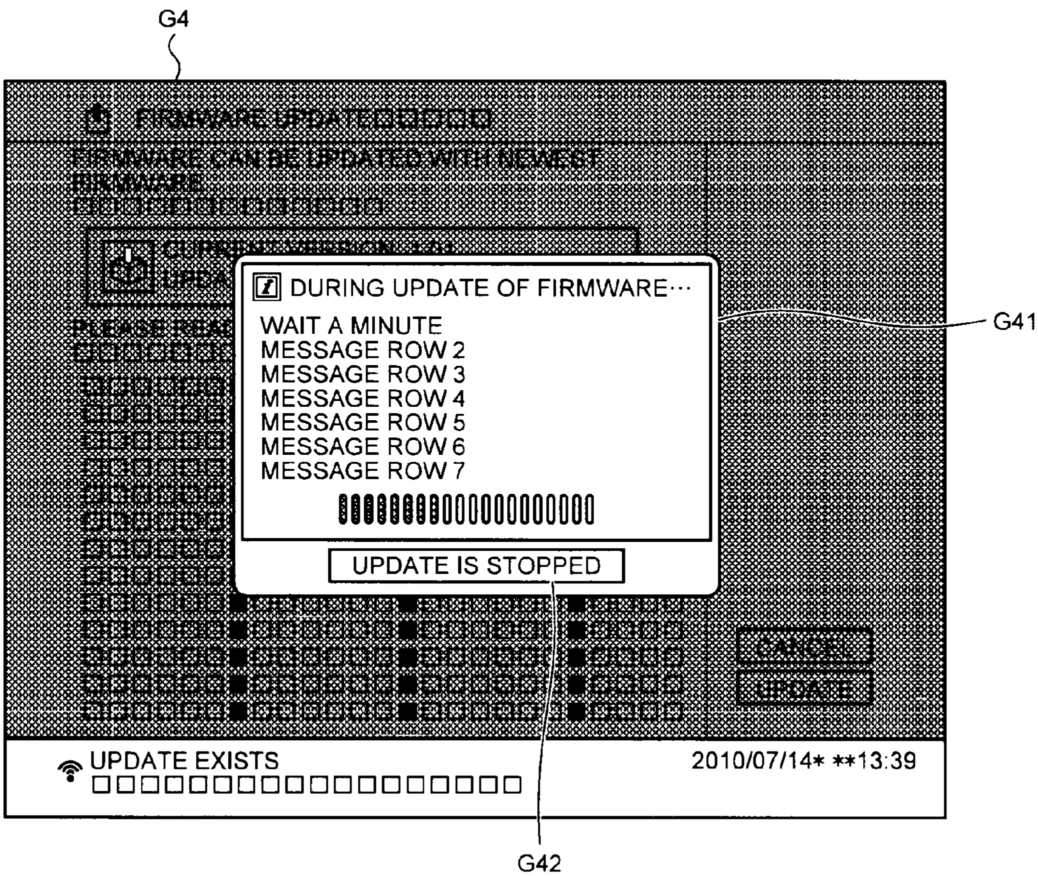
FIG. 12 is a conceptual diagram illustrating an example of an update screen.

FIG. 12 is a conceptual diagram illustrating an example of the update screen G4. As illustrated in FIG. 12, the update screen G4 is a screen that is displayed on the display 13 by the user interface unit 1102 during the update process performed by the update unit 1103. On the update screen G4, an update status window G41 to display the progress status of the update notified by the update unit 1103 and an operation button G42 for instructing to stop the update are displayed. The user can confirm the progress status of the update from the displayed contents of the update status window G41.

In addition, remaining time for the update or a current line speed may be displayed in real time on the update screen G4. In this case, the user can clearly grasp the details of the progress status of the update.

Next, the update unit 1103 determines whether an error occurs (step S105). When the error occurs (Yes at step S105), the process at steps S101 to S106 are skipped and the process sequence proceeds to step S107. At step S105, in addition to the error (for example, difference of the checksum at step S103) that occurs due to some factor during the execution of the update, it is determined that an error occurs even when the update is stopped by the operation of the operation button G42 on the update screen G4 or the version resulted from the update executed at steps S102 and S103 needs to reboot the self device. Therefore, when the update is executed consecutively in order of the version numbers, the processes at steps S101 to S106 are skipped at a step where the update of the version that needs to reboot the self device is executed.

When the error does not occur (No at step S105), the update unit 1103 determines whether the update has been completed for all the versions related to the acquired metadata (step S106). When the update has not been completed for all the versions (No at step S106), the process returns to step S101 and the update process continues. When the update has been completed for all the versions (Yes at step S106), the processes at steps S101 to S106 are skipped and the process sequence proceeds to step S107.

At step S107, the update unit 1103 notifies the user interface unit 1102 of the results of the update at steps S106 and S107. The user interface unit 1102 displays the notified results of the update on the screen of the display 13 to notify the user of the results of the update.

Figure 13:
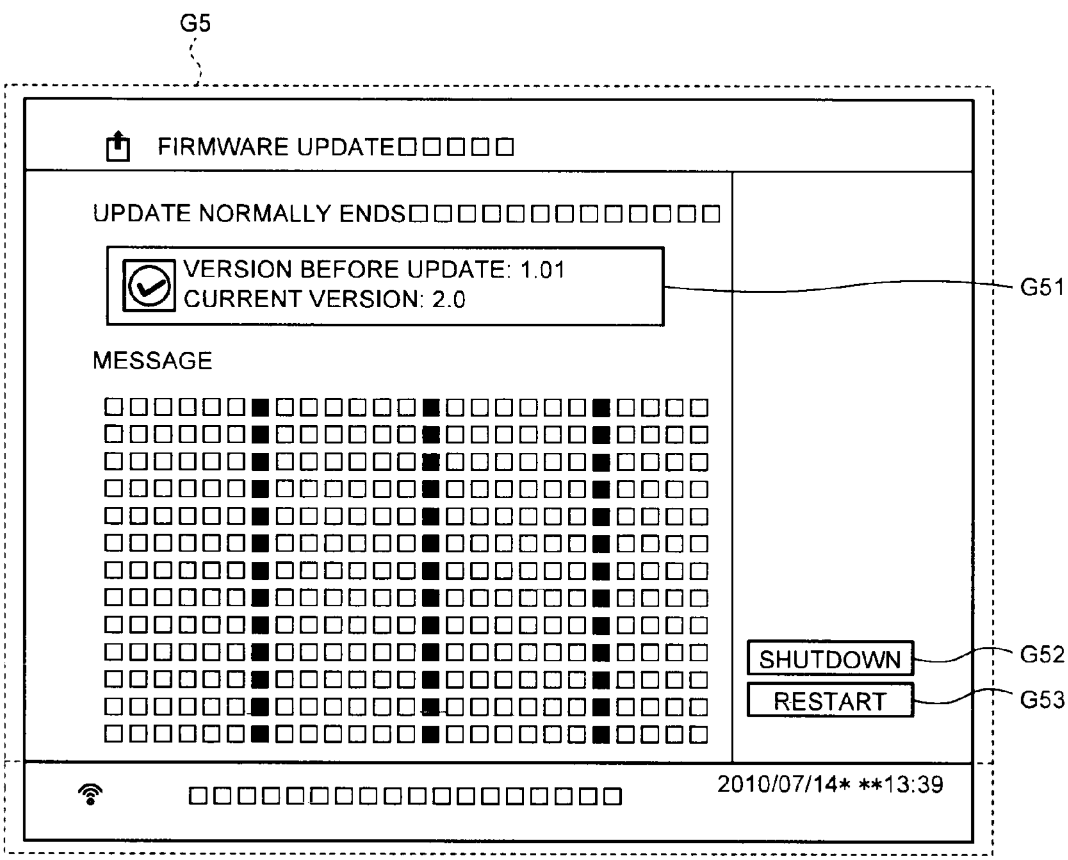
FIG. 13 is a conceptual diagram illustrating an example of a confirmation screen according to the first embodiment.

FIG. 13 is a conceptual diagram illustrating an example of the confirmation screen G5. Upon receiving the results of the update, the user interface unit 1102 displays on the confirmation screen G5, as illustrated in FIG. 13, the results of the update G51 at steps S106 and S107 or the operation buttons G52 and G53 to receive an operation for a shutdown after the update or the reboot. In the results of the update G51, information related to the version before the update and information related to a current version by the update at steps S106 and S107 are displayed. The user can confirm the result of the update from the displayed contents of the results of the update G51.

Next, the update unit 1103 determines whether the reboot is needed, on the basis of the written contents of the "require_reboot" included in the metadata having been written in executing the update at steps S101 to S106 (step S108). When the reboot is not needed (No at step S108), the update unit 1103 ends the update process without performing the reboot (step S109). When the reboot is needed (Yes at step S108), the update unit 1103 reboots the self device and ends the process (step S110). As such, when an update requiring the reboot is executed, the reboot is automatically executed after the update, without an operation by the user.

As such, in this embodiment, when an update to be executed in the call terminal 11 exists, the user can select execution of the update, thereby the user-friendliness can be improved.

Modification

In the embodiment described above, when an update exists, a selection operation as to whether the update is to be executed is received by the user, irrespective of whether the update is compulsory. When the update is not executed, the process of the self device ends.

However, when an update exists and is compulsory, the update may be executed without notifying the user of existence of the update. Specifically, the process at step S17 illustrated in FIG. 5 may be executed immediately after step S10, and when the compulsory update exists, the process at step S11 may be skipped and the process may proceed to step S16.

Since a call may not be executed in a situation where the compulsory update is not executed, the update is executed with the highest priority. Therefore, in this case, the update is preferably executed without requiring confirmation of the user.

(Second Embodiment)

Figure 14:
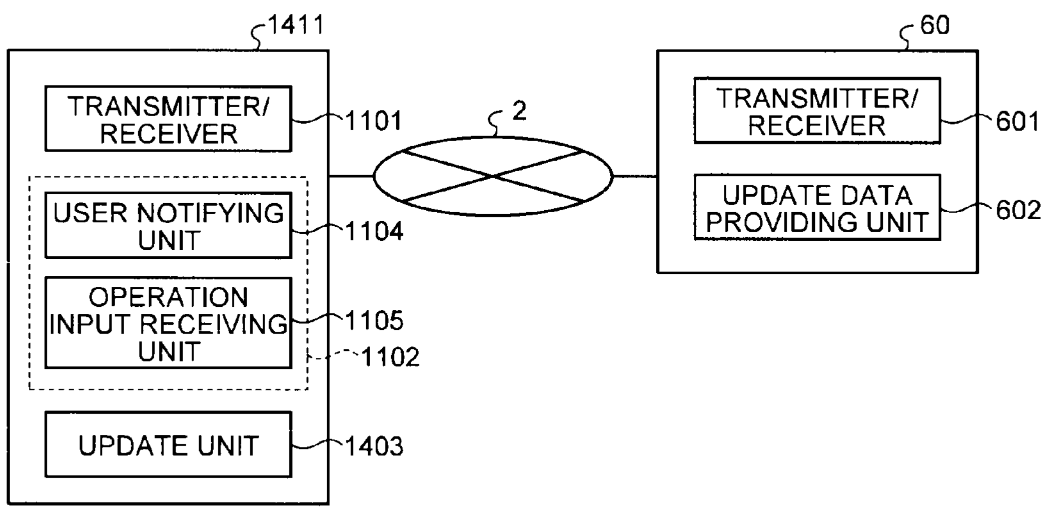
FIG. 14 is a block diagram illustrating an example of the functional configuration of a call terminal and an update server 60 according to a second embodiment.

FIG. 14 is a block diagram illustrating an example of the functional configuration of a call terminal 11 and an update server 60 according to the second embodiment. As illustrated in FIG. 14, a call terminal 1411 includes a transmitter/ receiver 1101, a user interface unit 1102, and an update unit 1403 as main components. Here, functions of the transmitter/receiver 1101 and the user interface unit 1102 are the same as those of the first embodiment.

The update unit 1403 executes an update of the computer program 104 or various setting information stored in the storage unit 105 on the basis of the update-related information acquired from the transmitter/receiver 1101 through the update server 60. An execution process of the compulsory update performed by the update unit 1403 according to the present embodiment is different from that of the first embodiment. That is, when the compulsory update exists, the update unit 1403 according to this embodiment changes a screen to a compulsory update screen to let the user select, on the compulsory update screen, any one of execution of the compulsory update, change to a setting screen, and turning off of the power supply. Further, the meanings and the objects of the normal update and the compulsory update are the same as those of the first embodiment. The structure and the contents of the metadata are also the same as those of the first embodiment.

The update server 60 includes a transmitter/receiver 601 and an update data providing unit 602 as main components and the configuration and the function thereof are the same as those of the first embodiment.

Figure 15:
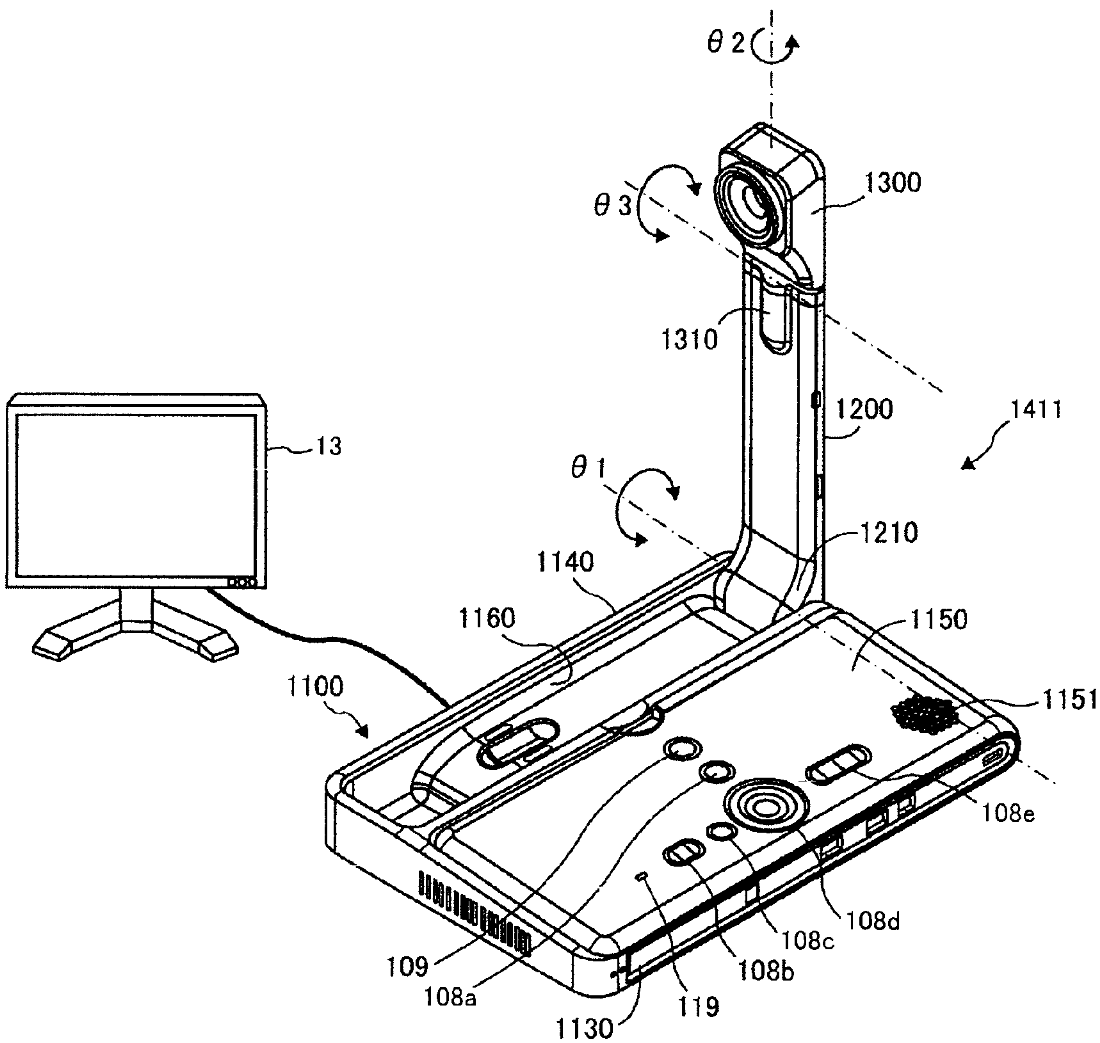
FIG. 15 is an exterior view illustrating the call terminal according to the second embodiment.

Next, the exterior configuration of the call terminal 1411 will be described. FIG. 15 is an exterior view illustrating the call terminal 1411 according to the second embodiment. As illustrated in FIG. 15, the call terminal 1411 includes a casing 1100, an arm 1200, and a camera housing 1300.

On a top surface of the casing 1100 on a right wall surface 1130 side, an operation panel 1150 is formed. On the operation panel 1150, a plurality of operation buttons 108*a* to 108*e* functioning as the operation unit 108, a power switch 109, an alarm lamp 119, and a voice output surface 1151 to output a voice from an incorporated speaker are formed.

On a left wall surface 1140 side of the casing 1100, a storage portion 1160 that functions as a concave portion to store the arm 1200 and the camera housing 1300 is formed. To the casing 1100 of the call terminal 1411, the display 13 is connected through a cable.

The arm 1200 is attached to the casing 1100 through a torque hinge 1210 so that the arm 1200 can rotate in an up-down direction, in a range of a tilt angle θ1, 135 degrees, with respect to the casing 1100. FIG. 15 illustrates a state in which the tilt angle θ1 is 90 degrees.

The camera 12 is incorporated in the camera housing 1300 and the camera can capture images of the user, a document, and a room. In the camera housing 1300, a torque hinge 1310 is formed. The camera housing 1300 is attached to the arm 1200 through the torque hinge 1310. The camera housing 1300 is configured to be rotatable in horizontal and vertical directions, in the range of a panning angle θ2 within ±180 degrees with respect to the state illustrated in FIG. 15, which is a state at 0 degree, and in the range of a tilt angle θ3 within ±45 with respect to the arm 1200.

Figure 16:
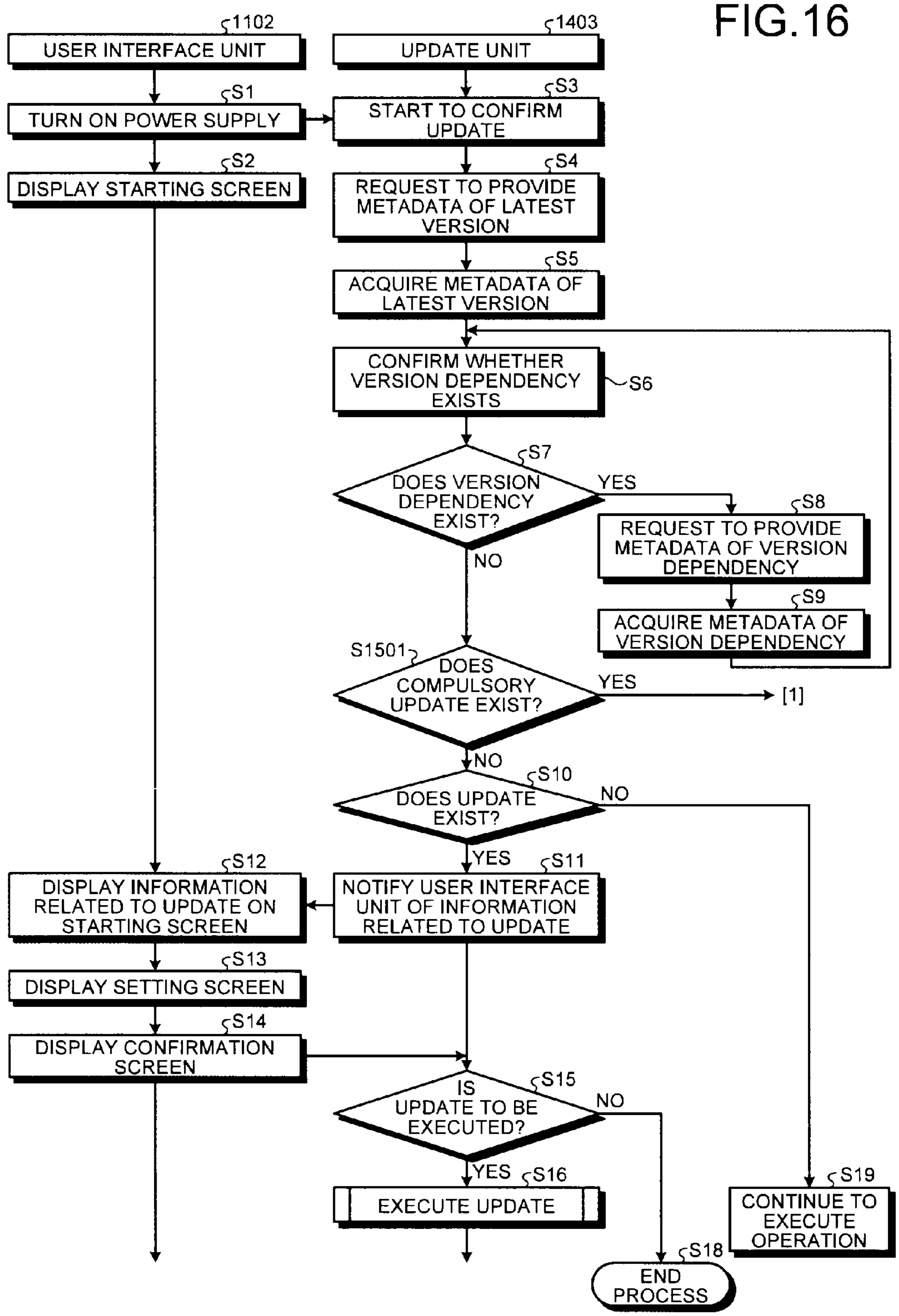
FIG. 16 is a ladder chart illustrating an example of an operation of the call terminal according to the second embodiment.
Figure 17:
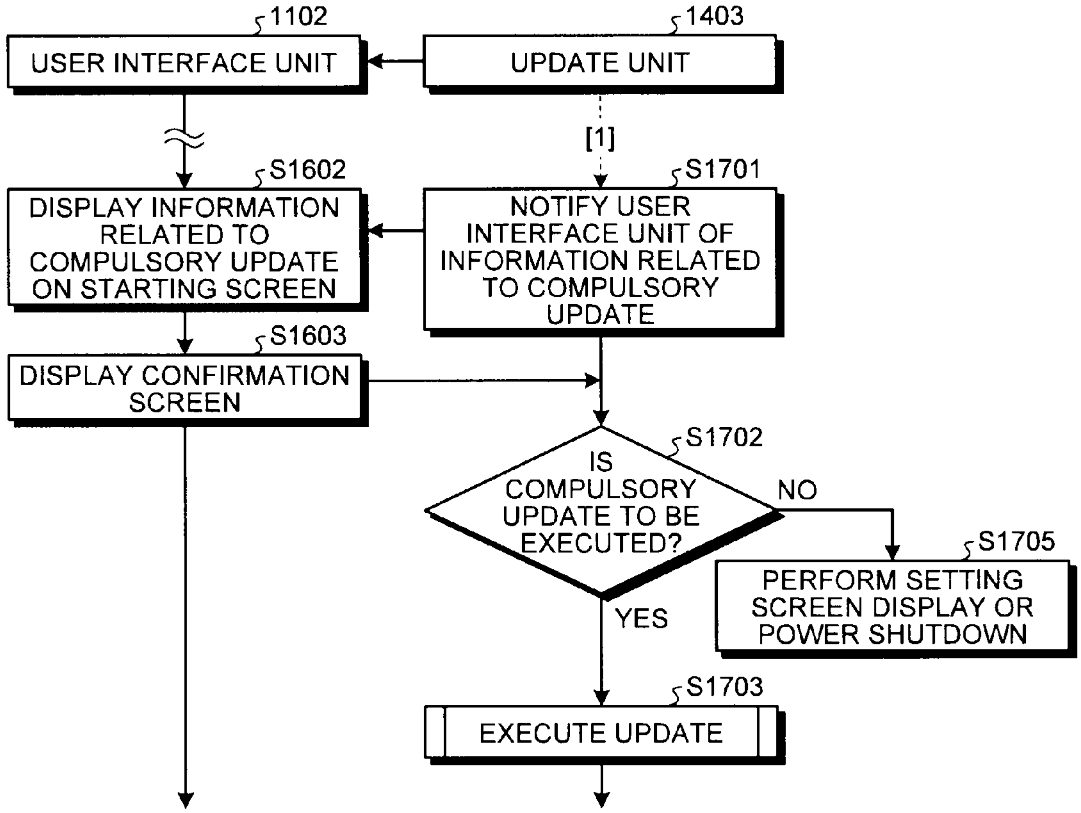
FIG. 17 is a ladder chart illustrating an example of the operation of the call terminal according to the second embodiment.

Next, an operation of the call terminal 1411 according to this embodiment having the above-described configuration will be described in detail. FIGS. 16 and 17 are ladder charts illustrating an example of the operation of the call terminal 1411 according to the second embodiment. The processes (steps S3 to S7), from the start of the confirmation of the update in the update unit 1403 to the confirmation as to whether the version dependency exists, and the processes (steps S8 to S9) performed when the version dependency exists are the same as those of the first embodiment.

When it is determined that the version dependency does not exist at step S7 (No at step S1501), the update unit 1403 determines whether the "force_update" of the acquired metadata is set to "true" and determines whether the update is the compulsory update (step S1501).

When the "force_update" of the acquired metadata is not set to "true" and the update is a normal update (No at step S1501), similarly to the first embodiment, the update unit 1403 confirms the existence of the update (normal update) (step S10). The following processes are executed in the same way as the first embodiment. However, when the normal update is not executed at step S15 (No at step S15), because it has been confirmed whether the compulsory update exists at step S1501, unlikely to the first embodiment, the process ends without confirming whether the compulsory update exists (step S18).

The processes (steps S1 to S4) that are executed by the user interface unit 1102 and the starting screen, the setting screen, and the confirmation screen that are displayed during the processes are the same as those of the first embodiment.

At step S1501, when the "force_update" of the metadata is set to "true" (Yes at step S1501), the update unit 1403 notifies the user interface unit 1102 of the information related to the compulsory update (step S1701). Specifically, similarly to the first embodiment, the update unit 1403 notifies the user interface unit 1102 of the data items other than the data items that do not need to be notified to the user, such as the "files" or the "scriptname", in the metadata of the latest version and the version on which the latest version depends, as the information related to the update.

The user notifying unit 1104 of the user interface unit 1102 displays existence of the update needed for the self device on the starting screen of the display 13, on the basis of the information related to the update notified by the update unit 1403 at step S1602, and notifies the user of the existence of the update (step S1602). The contents of the starting screen are the same as those of the first embodiment.

If the information is notified to the user at step S1701, the user interface unit 1102 displays the confirmation screen to confirm the execution of the update on the display 13 (step S1603). The setting screen of the update screen in the first embodiment is not displayed.

Figure 18:
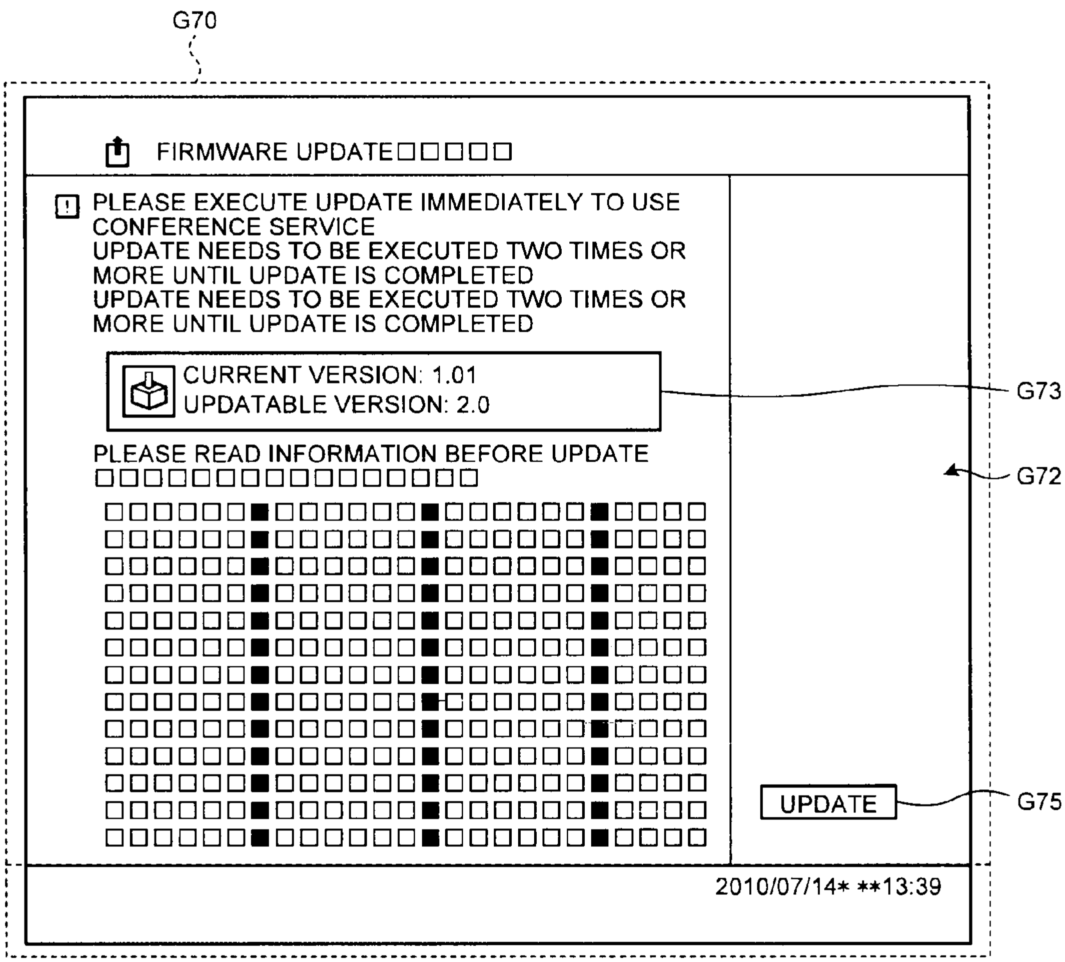
FIG. 18 is a conceptual diagram illustrating an example of a confirmation screen according to the second embodiment.

FIG. 18 is a conceptual diagram illustrating an example of the confirmation screen G70 according to the second embodiment. As illustrated in FIG. 18, the confirmation screen G70 includes a main screen G72 that includes an update display G73 to display contents of the executed update and an operation button G75 to receive an execution command of the update from the user. On the update display G73, displayed is not only information on the current version number, which is the version number of the computer program 104 of the self device, but also information on the version number of the latest version of the computer program which is to be compulsorily executed for updating according to the description of the data item "version" included as the information related to the compulsory update, so that the information is notified to the user. Therefore, the user can confirm the number of the version to be updated, according to the displayed contents of the update display G73.

In this case, only the update button G75 is displayed as a button displayed on the confirmation screen G70 of the compulsory update and the operation button G34 for the cancellation that is displayed on the confirmation screen G3 of the normal update is not displayed. This is because the update needs to be executed in the case of the compulsory update. However, a screen may be changed to a setting screen by the operation button corresponding to the menu key of the operation unit 108 or the power supply may be turned off by pressing the power switch 109.

Returning to FIG. 17, the update unit 1403 determines whether the compulsory update is to be executed on the basis of the selection operation of the operation button G75 in the confirmation screen G70 (step S1702). When the operation button G75 to instruct the execution of the compulsory update is selected (Yes at step S1702), the update unit 1403 executes an update process on the basis of the acquired metadata (step S1703).

Meanwhile, at step S1702, when the operation button G75 is not pressed and the operation button of the operation unit 108 is pressed (No at step S1702), display of the setting screen or power shutdown is performed according to the pressed operation button (step S1705).

Figure 19:
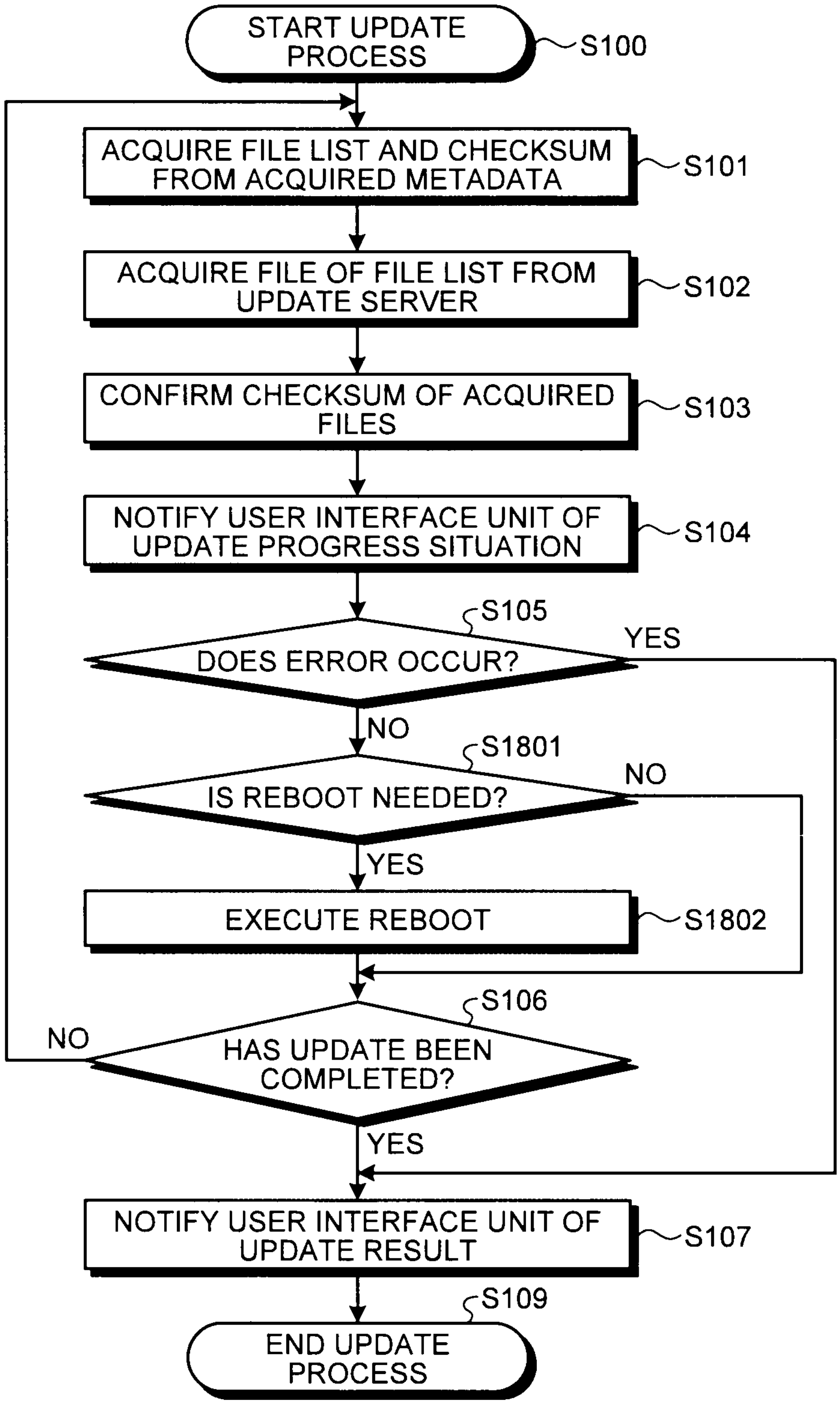
FIG. 19 is a flowchart illustrating an example of a sequence of an update process according to the second embodiment.

Next, the update process that is executed at steps S16 and S1703 will be described in detail. FIG. 19 is a flowchart illustrating an example of a sequence of the update process according to the second embodiment.

The processes (steps S101 to S105) from the acquisition of the file list and the checksum from the acquired metadata to the determination of the occurrence of the error are the same as those of the first embodiment.

When the error does not occur at step S105 (No at step S105), the update unit 1403 determines whether "true" is set to the item "require_reboot" included in the metadata and determines whether the reboot is needed (step S1801).

In this embodiment, the item "require_reboot" of the metadata indicates whether the reboot is needed before executing an update following the previously executed update. During the update process illustrated in FIG. 19, one update is executed by the processes from step S101 to step S106. When plural versions are updated, the processes from steps S101 to S106 are repeated for the number of versions to be updated. For this reason, in this embodiment, it is determined whether "true" is set to the item "require_reboot" included in the metadata, at the last stage of one loop of the processes from step S101 to step S106 to determine the necessity to reboot (step S1801), thereby the reboot is performed for each update.

When "true" is set to the item "require_reboot" and the reboot is needed (Yes at step S1801), the reboot of the call terminal 1411 is performed (step S1802).

The update unit 1403 determines whether the update for all the versions has been completed (step S106). When the update for all the versions has not been completed yet (No at step S106), the process proceeds to step S101 and continues to execute the update process. When the update for all the versions has been completed (Yes at step S106), the update unit 1403 notifies the user interface unit 1102 of the update result at steps S106 and S107 (step S107). The user interface unit 1102 displays the notified result of the update on a screen of the display 13 and notifies the user of the result of the update.

Figure 20:
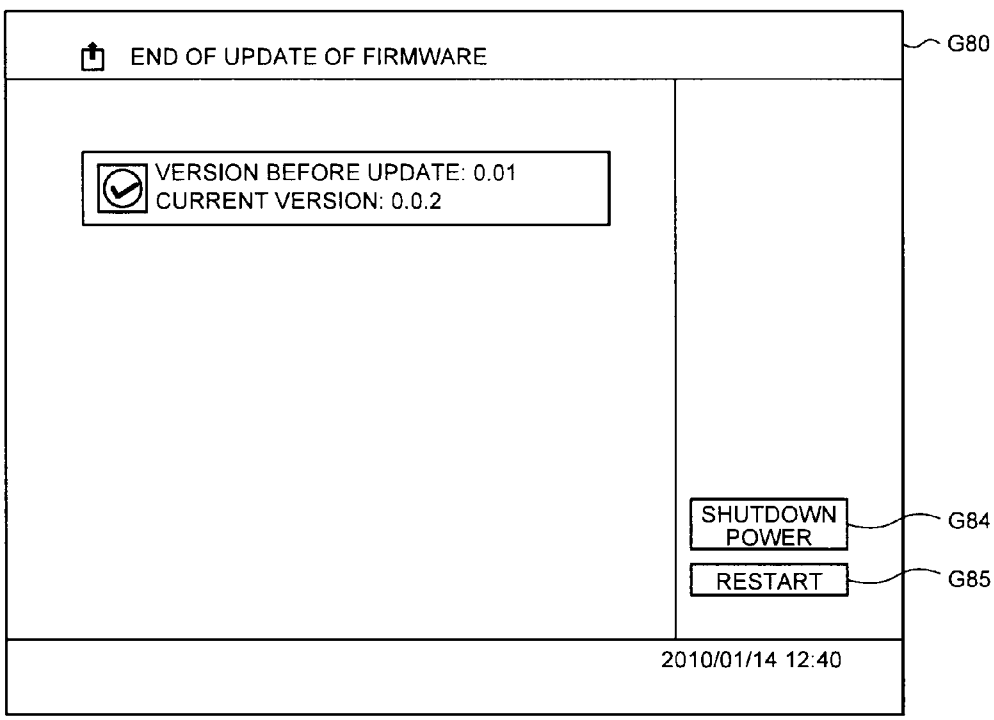
FIG. 20 is a conceptual diagram illustrating an example of a screen after a compulsory update according to the second embodiment.

As the result of the normal update, the screen of FIG. 13 illustrated in the first embodiment is displayed. Meanwhile, as the result of the compulsory update, a compulsory update result screen G80 illustrated in FIG. 20 is displayed. A power shutdown button G84 and a rebooting button G85 are displayed on the compulsory update result screen G80 and the user can press any of the power shutdown button G84 and the rebooting button G85.

If the update unit 1403 notifies the user interface unit 1102 of the update result, the update unit 1403 ends the update process (step S109). That is, in this embodiment, since the rebooting process in the course of the update processes of one version (steps S101 to S105, S180, and S1802) is executed, the reboot is not executed after the update result is notified, unlikely to the first embodiment.

As such, in this embodiment, in addition to the first embodiment, when the call terminal 1411 needs to execute the compulsory update, because the call terminal 1411 executes the compulsory update without allowing the user to select the cancellation of the update, the original function of the call terminal 1411 can be avoided from being not capable of executing due to an update of the device other than the call terminal 1411, such as the repeater 30.

In the first and second embodiments, the remote communication management server 50 and the update server 60 are configured to be separated from each other. However, the present invention is not limited thereto. For example, a server device may be provided and the server device may have a function of the remote communication management server 50 and a function of the update server 60.

According to the present invention, when an update to be executed exists in a communication device, a user can select whether or not to execute the update. This improves the convenience of the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device comprising:

circuitry that receives metainformation indicating an update from an update information providing device to provide information related to the update which includes at least version information of the update for a program;

determines, on the basis of the received metainformation, whether an update for the communication device is needed based on comparing the version information of the update included in the metainformation with a current version information of the program on the communication device and a result of the comparison indicating that the current version of the program is older than the version information of the update;

notifies, when the update exists, a user of existence of the update;

receives, when the update exists, a selection operation as to whether the update is to be executed from the user;

executes, when the selection operation to execute the update is received, the update on the basis of the received metainformaton; and receives the metainformation indicating the update from the update information providing device by communication with the update information providing device which is established on the basis of an address of the update information providing device, the address received from a communication management device which manages the communication performed by the communication device, and the communication management device provides the communication device with the address of the update information providing device but not the metainformation containing the version information of the update, and the update information providing device provides the communication device with the metainformation containing the version information of the update without going through the communication management device, the metainformation indicates whether an update is compulsory or non-compulsory, the circuitry controls display of the existence of the update on a display screen of a display, when the update is non-compulsory, the circuitry controls display of the display screen of the non-compulsory update to include an input area for confirmation of the update and an input area for cancellation of the update, when an input is received at the input area for confirmation of the update, the non-compulsory update is executed, and when an input is received at the input area for cancellation of the update, the non-compulsory update is not executed, when the update is compulsory, the circuitry controls display of the display screen of the compulsory update to include an input area for confirmation of the update without having an input area for cancellation of the update, and when an input is received at the input area for confirmation of the update, the compulsory update is executed, and the communication device is configured to participate in a conference call with at least one other communication device in a communication network, and when the metainformation includes update compulsory information that indicates a compulsory update, the circuitry is configured to prevent the user from executing any function related to participating in a conference call until the compulsory update is executed.

2. The communication device according to claim 1, wherein the metainformation includes dependency information that indicates a dependency relation of a plurality of updates, such that a dependency relation exists when a latest update version must be updated from a particular older version of the update, and when the dependency relation exists, on the basis of the dependency information included in the received metainformation, the communication device transmits a request to receive additional metainformation on the version dependency to the update information providing device, and when the communication device does not have the latest update version and the particular older version, the circuitry sequentially executes at least the update for the particular older version and then the latest update version.

3. The communication device according to claim 1, wherein the metainformation includes update compulsory information that indicates a compulsory update, and when an update of the communication device exists and the update compulsory information is included in the metainformation, the circuitry notifies the user that the existing update is a compulsory update.

4. The communication device according to claim 1, wherein the metainformation includes update compulsory information that indicates a compulsory update, and when an update of the communication device exists and the update compulsory information is included in the metainformation, the circuitry does not notify a user of the existence of the update, and the circuitry executes the update according to the update compulsory information included in the metainformation.

5. The communication device according to claim 1, wherein the metainformation includes reboot information that indicates whether a reboot of the communication device is to be executed after an update is executed, and when an update of the communication device exists, the circuitry notifies the user of an inquiry as to whether the reboot is to be executed after the update on the basis of the reboot information.

6. The communication device according to claim 5, wherein the reboot information indicates whether the reboot of the communication device is to be executed after one update is executed, when the update of the communication device to be executed exists in each time the one update has been executed, the circuitry notifies the user of an inquiry as to whether the reboot is to be executed after the update on the basis of the reboot information.

7. The communication device according to claim 1, further comprising:

the display.

8. The communication device according to claim 1, wherein the circuitry acquires the metainformation at the time of a reboot after power is supplied, and the circuitry notifies the user of the existence of the update at the time of the reboot.

9. The communication device according to claim 1, wherein, during execution of the update, the circuitry stops a function of an interface unit for connecting to an external device.

10. The communication device according to claim 9, wherein the metainformation includes reboot information that indicates whether a reboot of the communication device is to be executed after the update is executed, and when the selection operation to execute the update is received by the operation receiver, after the update is executed, the circuitry executes the reboot of the communication device on the basis of the reboot information.

11. The communication device according to claim 10, wherein, when the selection operation to execute the update is not received and update compulsory information indicating compulsory update is included in the metainformation, the circuitry executes a terminating process to terminate a process of the communication device.

12. An update method that is executed by a communication device having circuitry, the update method comprising:

receiving metainformation indicating an update from an update information providing device to provide information related to the update which includes at least version information of the update for a program;

determining by the circuitry, on the basis of the received metainformation, whether an update for the communication device is needed based on comparing the version information of the update included in the metainformation with a current version information of the program on the communication device and a result of the comparison indicating that the current version of the program is older than the version information of the update;

notifying a user of existence of the update when the update exists;

receiving, from the user, a selection operation as to whether the update is to be executed when the update exists;

executing by the circuitry, when the selection operation to execute the update is received at the receiving, the update on the basis of the received metainformation, receiving, by the communication device, the metainformation indicating the update from the update information providing device by communication with the update information providing device which is established on the basis of an address of the update information providing device, the address being obtained by the circuitry from a communication management device which manages the communication performed by the communication device, and the communication management device provides the communication device with the address of the update information providing device but not the metainformation containing the version information of the update, and the update information providing device provides the communication device with the metainfomiation containing the version information of the update without going through the communication management device, the metainformation indicates whether an update is compulsory or non-compulsory, the method includes controlling, by the circuitry, display of the existence of the update on a display screen of a display and notifying the user of the existence of the update, when the update is non-compulsory, the method includes controlling, by the circuitry, display of the display screen of the non-compulsory update to include an input area for confirmation of the update and an input area for cancellation of the update, when an input is received at the input area for confirmation of the update, the non-compulsory update is executed, and when an input is received at the input area for cancellation of the update, the non-compulsory update is not executed, when the update is compulsory, the method includes controlling, by the circuitry, display of the display screen of the compulsory update to include an input area for confirmation of the update without having an input area for cancellation of the update, and when an input is received at the input area for confirmation of the update, the compulsory update is executed, and the communication device is configured to participate in a conference call with at least one other communication device in a communication network, and when the metainformation includes update compulsory information that indicates a compulsory update, the method includes preventing, by the circuitry, the user from executing any function related to participating in a conference call until the compulsory update is executed.

13. A non-transitory computer-readable medium having computer-readable program codes recorded in the medium for causing a communication device having circuitry to execute an update method comprising:

receiving, metainformation indicating an update from an update information providing device to provide information related to the update which includes at least version information of the update for a program;

determining, on the basis of the received metainformation, whether an update for the computer is needed based on comparing the version information of the update included in the metainformation with a current version information of the program on the computer and a result of the comparison indicating that the current version of the program is older than the version information of the update;

notifying a user of existence of the update when the update exists;

receiving, from the user, a selection operation as to whether the update is to be executed when the update exists;

executing, when the selection operation to execute the update is received at the receiving, the update on the basis of the received metainformation; and receiving, by the communication device, the metainformation indicating the update from the update information providing device by communication with the update information providing device which is established on the basis of an address of the update information providing device, the address being obtained by the receiver from a communication management device which manages the communication performed by the communication device, and the communication management device provides the communication device with the address of the update information providing device but not the metainformation containing the version information of the update, and the update information providing device provides the communication device with the metainfomiation containing the version information of the update without going through the communication management device, the metainformation indicates whether an update is compulsory or non-compulsory, the method includes controlling display of the existence of the update on a display screen of a display and notifying the user of the existence of the update, when the update is non-compulsory, the method includes controlling display of the display screen of the non-compulsory update to include an input area for confirmation of the update and an input area for cancellation of the update, when an input is received at the input area for confirmation of the update, the non-compulsory update is executed, and when an input is received at the input area for cancellation of the update, the non-compulsory update is not executed, when the update is compulsory, the method includes controlling display of the display screen of the compulsory update to include an input area for confirmation of the update without having an input area for cancellation of the update, and when an input is received at the input area for confirmation of the update, the compulsory update is executed, and the communication device is configured to participate in a conference call with at least one other communication device in a communication network, and when the metainformation includes update compulsory information that indicates a compulsory update, the method includes preventing the user from executing any function related to participating in a conference call until the compulsory update is executed.

14. The communication device according to claim 1, wherein the compulsory update is related to a change in a configuration of a device in the communication network that is separate from the communication device and the other communication device, that is necessary for the communication device to participate in the conference call.

15. The communication device according to claim 14, wherein the compulsory update is an update in a data format of voice, image, or video data that is transmitted and received during the conference call.

16. The communication device according to claim 14, wherein the compulsory update is configured to fix a security hole that exists in the communication network.

17. The communication device according to claim 1, wherein the communication management device that provides the communication device with the address of the update information providing device is the communication management device that is accessed by the communication device at the time of a startup of the communication device, and the communication device makes an inquiry to the update information providing device in order to receive the metainformation indicating the update at the time of the startup.

18. The communication device according to claim 14, wherein the device in the communication network is a relay device.

* * * * *